US009696966B2

(12) United States Patent
Edwards et al.

(10) Patent No.: US 9,696,966 B2
(45) Date of Patent: Jul. 4, 2017

(54) SOFTWARE DEVELOPMENT TOOL TO AUTOMATICALLY GENERATE AN OPTIMIZED EXECUTABLE

(71) Applicant: Somnium Technologies Limited, Gwent (GB)

(72) Inventors: David Alan Edwards, Bristol (GB); Martin Charles Young, Bristol (GB)

(73) Assignee: Somnium Technologies Limited (GB)

( * ) Notice: Subject to any disclaimer, the term of this patent is extended or adjusted under 35 U.S.C. 154(b) by 0 days.

(21) Appl. No.: 14/909,440

(22) PCT Filed: Aug. 1, 2014

(86) PCT No.: PCT/GB2014/052377
§ 371 (c)(1),
(2) Date: Feb. 1, 2016

(87) PCT Pub. No.: WO2015/015225
PCT Pub. Date: Feb. 5, 2015

(65) Prior Publication Data
US 2016/0196112 A1 Jul. 7, 2016

(30) Foreign Application Priority Data
Aug. 2, 2013 (GB) .................................. 1313902.7

(51) Int. Cl.
*G06F 9/44* (2006.01)
*G06F 9/45* (2006.01)
(52) U.S. Cl.
CPC .............. *G06F 8/30* (2013.01); *G06F 8/4441* (2013.01)
(58) Field of Classification Search
CPC .................................. G06F 8/30; G06F 8/4441
(Continued)

(56) References Cited

U.S. PATENT DOCUMENTS 5,212,794 A 5/1993 Pettis et al.
5,469,572 A 11/1995 Taylor
(Continued)

FOREIGN PATENT DOCUMENTS

EP 0428084 A2 5/1991
EP 0459192 A2 12/1991
(Continued)

OTHER PUBLICATIONS

International Search Report from corresponding International Application No. PCT/GB2014/052377, mailed Feb. 6, 2015.
(Continued)

*Primary Examiner* — Qing Chen
(74) *Attorney, Agent, or Firm* — Polster Lieder

(57) ABSTRACT

The software development tool (701) forms part of a software development kit (700). The software development tool (701) receives as input object files (606) and library files (607) and subjects the object file instructions and data definitions of the object files and the library files to re-sequencing to generate new object files and the links between them which are semantically equivalent to the input object files and library files and which are used to generate an optimized executable. The software development tool (701) is capable of automatically generating an executable, without requiring any modification of the source code, which is optimized to execute more deterministically and with respect to execution time; reduced processor and memory requirements; reduced off-chip memory accesses; reduced memory latency.

21 Claims, 14 Drawing Sheets

(58) Field of Classification Search
USPC .................................. 717/106–109, 151–161
See application file for complete search history.

(56) References Cited

U.S. PATENT DOCUMENTS

| | | | |
|---|---|---|---|
| 5,655,122 A | 8/1997 | Wu | |
| 5,889,999 A * | 3/1999 | Breternitz, Jr. | G06F 8/445 |
| | | | 712/201 |
| 5,966,539 A | 10/1999 | Srivastava | |
| 6,292,934 B1 | 9/2001 | Davidson et al. | |
| 6,317,874 B1 | 11/2001 | Prasanna | |
| 6,839,895 B1 | 1/2005 | Ju et al. | |
| 7,275,242 B2 | 9/2007 | Liu et al. | |
| 8,464,237 B1 * | 6/2013 | Taylor | G06F 8/41 |
| | | | 717/159 |
| 2002/0038453 A1 | 3/2002 | Riddle et al. | |
| 2003/0226133 A1 * | 12/2003 | Grover | G06F 8/443 |
| | | | 717/140 |
| 2004/0068719 A1 | 4/2004 | Liu et al. | |
| 2004/0205307 A1 * | 10/2004 | Pullen | G06F 8/4442 |
| | | | 711/158 |
| 2005/0235268 A1 | 10/2005 | Baldischweiler et al. | |
| 2006/0112377 A1 * | 5/2006 | Nacul | G06F 8/456 |
| | | | 717/140 |
| 2007/0061286 A1 | 3/2007 | Liu et al. | |
| 2008/0115120 A1 | 5/2008 | Clifton et al. | |
| 2010/0229164 A1 * | 9/2010 | Kwon | G06F 8/443 |
| | | | 717/162 |
| 2010/0275192 A1 * | 10/2010 | Serebryany | G06F 8/443 |
| | | | 717/151 |

FOREIGN PATENT DOCUMENTS

| | | |
|---|---|---|
| EP | 0464525 A2 | 1/1992 |
| EP | 0825531 A1 | 2/1998 |
| GB | 2463942 A | 4/2010 |
| WO | 03088039 A2 | 10/2003 |

OTHER PUBLICATIONS

UK Intellectual Property Office Search Report from corresponding Application No. GB1313902.7 dated Aug. 30, 2013.

Approximating Pareto Optimal Compiler Optimization Sequences—A Trade Off Between WCET, ACET and Code Size, Lokuciejewski et al, Software—Practice and Experience, (2011), J Wiley & Sons DOI.

* cited by examiner

Figure 3

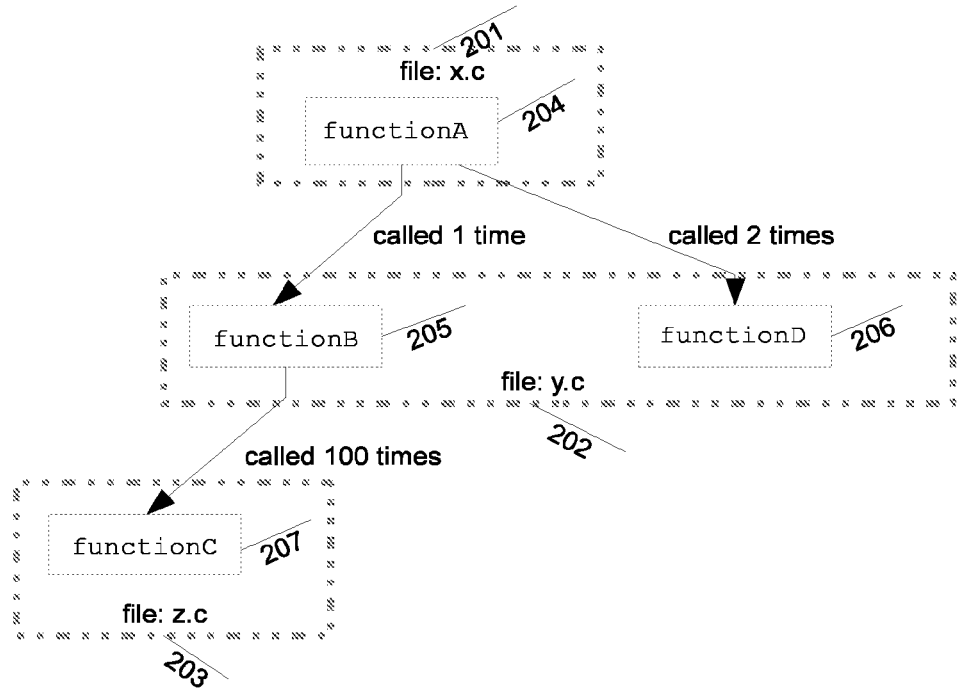

Figure 4

| instruction | label | contents |
|---|---|---|
| | functionA | |
| 300..309 | | .. arbitrary sequential instructions ... |
| 310 | | call functionB |
| 311..320 | | .. arbitrary sequential instructions ... |
| 321 | | return to caller |
| | | |
| | functionB | |
| 322..329 | | .. arbitrary sequential instructions ... |
| 330 | | conditional branch to labelX |
| 331..340 | | .. arbitrary sequential instructions ... |
| 341 | | unconditional branch to label Y |
| | labelX | |
| 342..343 | | .. arbitrary sequential instructions ... |
| | labelY | |
| 344..345 | | .. arbitrary sequential instructions ... |
| 346 | | return to caller |

Figure 5

| Line | Source Code | Branch version PC offset & instructions | | Predicated version PC offset & instructions | |
|---|---|---|---|---|---|
| 0 | int StrangeMath (int x, int y) { | | | | |
| 1 | if (x < 0) { | 0:<br>2: | BBa<br>cmp r0, #0<br>bpl.n 8 | 0:<br>2: | BBd<br>cmp r0, #0<br>ite lt |
| 2 | return (x + y); | 4:<br>6: | BBb<br>adds r0, r0, r1<br>bx lr | 4: | addlt r0, r0, r1 |
| 3 | } else { | | | | |
| 4 | return (x * 6); | 8:<br>a: | BBc<br>muls r0, r0, r1<br>bx lr | 6: | mulge r0, r0, r1 |
| 5 | } | | | 8: | bx lr |
| 6 | } | | | | |

Figure 7

| BCET = 4 + *pipeStages* | | | | | |
|---|---|---|---|---|---|
| WCET = 8 + (2 * *PipeStages*) + *nonSequentialFetchPenalty* | | | | | |
| Cortex™ M3 | | | | | |
| (I-Buffer state is "hot" i.e. *nonSequentialFetchPenalty* is I-Hit) | | | | | |
| BCET = 7 | | | | | |
| WCET = 14 | | | | | |
| ACET = 11 | | | | | |
| (I-Buffer state is "cold" i.e. *nonSequentialFetchPenalty* is full I-Miss penalty) | | | | | |
| BCET = 7 | | | | | |
| WCET = 64 | | | | | |
| ACET = 36 | | | | | |
| Cortex™ A15 | | | | | |
| (I-Buffer state is "hot" i.e. assuming non-sequential fetch is I-Hit) | | | | | |
| BCET = 19 | | | | | |
| WCET = 38 | | | | | |
| ACET = 29 | | | | | |
| (I-Buffer state is "cold" i.e. assuming non-sequential fetch is full I-Miss penalty) | | | | | |
| BCET = 19 | | | | | |
| WCET = 538 | | | | | |
| ACET = 278 | | | | | |
| x < 0 | PC offset | 0: | 2: | 4: | 6: |
|  | cycles | 1 | 1 | 1 | 1 + *PipeStages* |
| x > 0 | PC offset | 0: | 2: | 8: | a: |
|  | cycles | 1 | 1 + *PipeStages* + *nonSequentialFetchPenalty* | 5 | 1 + *PipeStages* |

Figure 8

| BCET = 5 + *pipeStages* | | | | | |
|---|---|---|---|---|---|
| WCET = 9 + *pipeStages* | | | | | |
| Cortex™ M3 | | | | | |
| | | | | | BCET = 8 |
| | | | | | WCET = 12 |
| | | | | | ACET = 10 |
| Cortex™ A15 | | | | | |
| | | | | | BCET = 20 |
| | | | | | WCET = 24 |
| | | | | | ACET = 22 |
| x < 0 | PC offset | 0: | 2: | 4: | 6: | 8: |
| | cycles | 1 | 1 | 1 | 1 | 1 + *PipeStages* |
| x > 0 | PC offset | 0: | 2: | 8: | a: | |
| | cycles | 1 | 1 | 1 | 5 | 1 + *PipeStages* |

Figure 9

| Line | Source Code | mov version (22 bytes) | | PC-relative load version (20 bytes) | |
|---|---|---|---|---|---|
| 0 | int Silly (int x) { | Cortex™ M3 | | Cortex™ M3 with D-Hit, D-Hit | |
| | | BCET = 10 | | BCET = 16 | |
| | | WCET = 10 | | Cortex™ M3 with D-Miss, D-Hit | |
| | | | | WCET = 61 | |
| | | PC offset & instructions | | PC offset & instructions | |
| 1 | return (0xdeadbeef + (x * 0xc0edbabe)); } | 0: | movw r2, 0xbabe | 0: | ldr r1, [pc, #8] |
| | | 4: | movw r3, 0xbeef | 2: | ldr r2, [pc, #12] |
| | | 8: | movt r2, 0xc0ed | 4: | mla r0, r2, r0, r3 |
| | | c: | movt r3, 0xdead | 8: | bx lr |
| | | 10: | mla r0, r2, r0, r3 | a: | nop |
| | | 14: | bx lr | c: | 0xc0edbabe |
| | | | | 10: | 0xdeadbeef |

Figure 10

| | |
|---|---|
| struct { | |
|   char fooMask; | bytes 0..0 |
| | bytes 1..3 unused due to alignment padding |
|   unsigned int arrayOfValues[16384]; | bytes 4..65539 |
|   char barMask; | bytes 65540..65540 |
| } exampleStruct; | |

Figure 11

```
struct {                              bytes 0..0
  char fooMask;                       bytes 1..1
  char barMask;                       bytes 2..3 unused due to alignment padding
  unsigned int arrayOfValues[16384];  bytes 4..65539
} exampleStruct;
```

Figure 12

| Cortex™ Model | Pipeline stages | Branch prediction | Instruction Cache | Typical I-Miss penalty (based on speed of typical underlying memory systems) |
|---|---|---|---|---|
| M0 | 3 | none | no | 10 .. 30 cycles |
| M0+ | 2 | none | no | 10 .. 30 cycles |
| M3 | 3 | yes | no | 10 .. 50 cycles |
| M4 | 3 | yes | no | 10 .. 50 cycles |
| A5 | 9 | yes | yes | 20 .. 300 cycles |
| A7 | 8 | yes | yes | 20 .. 500 cycles |
| A8 | 13 | yes | yes | 20 .. 300 cycles |
| A9 | 9 .. 12 | yes | yes | 20 .. 500 cycles |
| A15 | 15 | yes | yes | 20 .. 500 |

Figure 13

| | | |
|---|---|---|
| n/a | `extern int _foo;` | `0000002c <.L6>:`<br>`  2c: .word   0x00000000` |
| BBa | `int wob (int x, int array[])`<br>`{`<br>`  if (x > 10) {` | `00000000 <wob>:`<br>`  0: cmp     r0, #10`<br>`  2: push    {r4, lr}`<br>`  4: mov     r3, r0`<br>`  6: ble.w   26 <.L2>` |
| BBb | `    int y = 0;`<br>`    int i;`<br>`    for (i = 0;` | `  a: movs    r2, #0`<br>`  c: mov     r0, r2`<br>`  e: b.w     1a <.L3>` |
| BBc1 | `         i < (x+10);`<br>`         i++) {` | `0000001a <.L3>:`<br>`  1a: add.w   r4, r3, #9`<br>`  1e: cmp     r4, r2`<br>`  20: bge.w   12 <.L4>` |
| BBc0 | `      y += array[i];`<br>`    }` | `00000012 <.L4>:`<br>`  12: ldr.w   r4, [r1], #4`<br>`  16: adds    r2, #1`<br>`  18: adds    r0, r0, r4` |
| BBd | `    return y;` | `  24: pop     {r4, pc}` |
| | `  } else {` | |
| BBe | `    return _foo;`<br>`}` | `00000026 <.L2>:`<br>`  26: ldr     r3, [pc, #4] ; (2c <.L6>)`<br>`  28: ldr     r0, [r3, #0]`<br>`  2a: pop     {r4, pc}` |

|  }  |  |
|---|---|

Figure 13 cont.

Symbol table shown with:

```
    arm-none-eabi-readelf -a bb_and_edges.gcc.Os.o
    Symbol table '.symtab' contains 16 entries:
Symbol table '.symtab' contains 16 entries:
   Num:    Value  Size Type    Bind    Vis      Ndx Name
     0: 00000000     0 NOTYPE  LOCAL   DEFAULT  UND
     1: 00000000     0 FILE    LOCAL   DEFAULT  ABS bb_and_edges.c
     6: 00000026     0 NOTYPE  LOCAL   DEFAULT    1 .L2
     7: 0000001a     0 NOTYPE  LOCAL   DEFAULT    1 .L3
     8: 00000012     0 NOTYPE  LOCAL   DEFAULT    1 .L4
     9: 0000002c     0 NOTYPE  LOCAL   DEFAULT    1 .L6
    10: 0000002c     0 NOTYPE  LOCAL   DEFAULT    1 .L7
    14: 00000001    48 FUNC    GLOBAL  DEFAULT    1 wob
    15: 00000000     0 NOTYPE  GLOBAL  DEFAULT  UND _foo
```

US 9,696,966 B2

SOFTWARE DEVELOPMENT TOOL TO AUTOMATICALLY GENERATE AN OPTIMIZED EXECUTABLE

CROSS-REFERENCE TO RELATED APPLICATIONS

This application is a National Stage of International Application No. PCT/GB2014/052377, filed Aug. 1, 2014, that claims priority to Great Britain Application GB 1313902.7, filed Aug. 2, 2013, the disclosures of the above applications are incorporated herein by reference.

FIELD OF THE INVENTION

The present invention relates generally to a software development tool used to optimize the performance of programs consisting of a plurality of instruction and data sequences for execution on a computer system comprising one or more processors and one or more memories providing storage of instructions and data. Reference herein to 'execution' on a computer system is intended generally as reference to a computer system performing a series of tasks defined by a set of instructions which may involve data manipulation, alteration, transportation and communication. Reference herein to an "executable" and an "executable file" is to be understood as reference to computer-readable instructions defining a series of tasks to be performed by a computer system.

The invention is not specific to any particular processor architecture and is not specific to a system context (e.g. an embedded processor system, a workstation or a supercomputer).

BACKGROUND OF THE INVENTION

Process Fundamentals

FIG. 1 shows a silicon chip 100 containing a plurality of Central Processing Units (CPUs) 101 which access a plurality of memories to fetch instructions, which when executed may perform read and write data accesses to a plurality of memories 109, 112. A few examples of such chips include, but are not limited to, the STMicroelectronics STM32 Flash Microcontrollers based on the ARM® Cortex™ processor, the Nvidia® Tegra 4 device incorporating ARM® Cortex™, Nvidia® GPU graphics processors and Nvidia®i500 modem processors for use in cellular phones and tablet computers, the Intel® 4950HQ processor incorporating Intel® Core™ i7 processor for use in workstations and servers, and the Tilera® GX-8009 processor for use in networking and multimedia equipment. A few examples of memories 109, 112 include, but are not limited to, non-volatile storage such as NOR flash memory, NAND flash memory, Ferro-electric memory (FRAM), Magneto-resistive memory (MRAM), and/or volatile storage such as static RAM (SDRAM) and Dynamic RAM (DRAM). Reference herein to "memory" and "memories" is intended as a general reference to anything capable of permanently or temporarily storing instructions and/or data and is intended to encompass accelerators, caches and buffers of the computer system.

Each CPU 101 contains an I-Port 102 to fetch instructions from memory, and a D-Port 103 to perform read and write data accesses to memory when such instructions are executed. The CPU 101 is directly connected to the I-Port 102, and to the D-Port 103, which are respectively connected to the I-Buffer 104 and D-Buffer 105, and the CPU along with the ports 101, 102, 103, 104, 105 operate at a much higher frequency than other on-chip components 106, 107, 108, 109, 110, and off-chip devices 112.

On-chip memory 109 is typically 10 to 50 times slower to access than the I-Buffer 104 and D-Buffer 105 as it is connected via the on-chip bus 108 and typically operates at a lower frequency. Due to the number of electrical circuits involved in accessing the on-chip memory 109, accesses to it consume more energy than to the I-Buffer 104 and D-Buffer 105.

External memory 112 runs at a lower frequency than all the on-chip components other than the memory controller 110. Accesses to it are typically 50 to 500 times slower than to the I-Buffer 104 and D-Buffer 105, as it is connected via the on-chip bus (108), memory controller 110 and external memory interconnect 111. Due to the number of electrical circuits involved in accessing the off-chip memory 112, and due to voltages and valency of the external memory interconnect 111, external memory accesses also consume more energy than accesses to the I-Buffer 104, D-Buffer 105 and on-chip memory 109.

The I-Buffer 104 is smaller than both the on-chip memory 109 and the off-chip memory 112 and stores a copy of instructions recently fetched by the CPU 101 via its I-Port 102 in case they are needed for execution in the future. This is known as temporal locality. When the I-Port 102 requests an instruction from a particular address, the I-Buffer 104 checks whether the required instruction exists within the I-Buffer and therefore can be provided immediately. This is known as an I-Hit. If the instruction does not exist within the I-Buffer 104, it has to be fetched from memory 109, 112 into the I-Buffer. This is known as an I-Miss.

The time taken for an I-Hit is less than an I-Miss and requires less circuitry to be activated, therefore a lower I-Miss rate will reduce the time and energy used when fetching instructions. Furthermore, reducing the I-Miss rate will reduce traffic on the on-chip bus 108, and to the underlying memories 109,112, providing more opportunity for operations to be enacted by the D-Buffer 105 and associated mechanisms, thus reducing time spent on D-Miss operations.

In an attempt to increase the I-Hit rate, accesses made by the I-Port 102 are typically a super-set of the actual accesses required. Dependant on mechanisms within the CPU (such as instruction pre-fetching and branch prediction) the I-Port may pre-fetch additional instructions not directly related to the current program flow in an attempt to place instructions in the I-Buffer before they are needed.

The structure and functionality of the I-Buffer 104 varies between different silicon chip designs, according to trade-offs between design complexity, silicon area required for the circuitry, the relative speed of the CPU 101 and the speeds and sizes of the on-chip memories 109, and the speed, size and nature of the off-chip memories 112. The I-Buffer's 104 characteristics include numOfStrides (the number of distinct sequentially addressed buffers), and the sizeOfStride (the number of sequentially addressed instructions in each stride). Critical Word First mechanisms may be implemented, such that on an I-Miss the address causing the I-Miss is accessed before other addresses in the stride.

Typical structures for the I-Buffer 104 range from simple buffers with numOfStrides=1 to hold a plurality of adjacent instructions, through to sophisticated multi-way and multi-level Instruction Caching mechanisms.

The D-Port 102 and D-Buffer 105 provide features analogous to the I-Port 102 and I-Buffer 104 for data read/write operations rather than instruction fetch. The D-Buffer 105 is smaller than both the on-chip memory 109 and the off-chip memory 112 and stores a copy of data recently read and written by the CPU 101 via its Data-Port 103. This is known as temporal locality. When the D-Port 103 requests a read/write at a particular address from the D-Buffer 105, a check is made whether the required data exists within the D-Buffer and thus can be accessed immediately. This is known as a D-Hit. If the data does not exist within the D-Buffer 105, it has to be accessed in the underlying memory 109, 112. This is known as a D-Miss.

The time taken for a D-Hit is less than a D-Miss and requires less circuitry to be activated, therefore the higher the D-Miss rate the more time and energy will be expended accessing memory. Furthermore, reducing the D-Miss rate will reduce traffic on the on-chip bus 108, and to the underlying memories 109, 112 providing more opportunity for operations to be enacted by the I-Buffer 104 and associated mechanisms and thus for I-Miss operations to complete more quickly.

Spatial locality refers to the likelihood of referencing an address increasing if an address nearby it was previously accessed. Exploiting spatial locality for instruction fetch can improve the I-Hit/I-Miss ratio. Exploiting spatial locality for data accesses can improve the D-Hit/D-Miss ratio.

Mechanisms within the I-Buffer 104 can exploit spatial locality and thus provide high-speed access to instructions buffered within it. Furthermore, properties of the on-chip memory 109 and off-chip memory 112 provide further opportunities to exploit spatial locality when refilling the I-Buffer 104, based upon properties of the memories and the interface, and doing so will improve performance.

As an example, if off-chip memory comprises a Micron M25P10-A serial NOR flash device it provides 1 MBytes of storage, arranged as 4 sectors of 32768 bytes, each sector comprising 512 pages of 256 bytes. Accessing an arbitrary 24-bit address requires 32 bits of serial command data to be transferred to the device, accessing the next ascending address requires no additional commands and thus is 32 times faster than accessing a random address.

If off-chip memory comprises a 64 MByte DDR DRAM formed from 4 independent 16 MByte memory banks, each arranged as 1024 columns of 8192 byte rows. Accessing a random address involves a transaction to "open" a row (requiring a number of cycles known as row-to-column delay), followed by a read operation using a column address and requiring multiple cycles to read the data. Accessing other addresses within an already open same row avoids the row-to-column cycles whereas accessing addresses in a different row requires another command and multiple cycles to close the row, followed by additional cycles to open the new row. Multiple memory banks can be "opened" at once, so arranging memory accesses to avoid conflicts in the same bank and row can improve performance considerably by benefiting from spatial locality within rows and within separate memory banks. Burst mode accesses, whereby all rows in a given column are accessed sequentially, can also improve performance, especially when used for I-Buffer/D-Buffer fill operations.

Software Development Tools Fundamentals

The target computer system 911 shown in FIG. 2 contains a plurality of processors 100 (equivalent to the processors in FIG. 1), off-chip memory 112 (equivalent to the memory in FIG. 1), and hardware interfaces 920 for connection to off-chip peripherals such as switches, motors and sensors. A Software Development Kit (SDK) consists of one or more software development tools which operate on a host computer 900 containing a plurality of processors 904 providing computer resources for running the SDK; RAM 901 to hold the programs and data processed by the SDK; file storage 902 such as, but not limited to, disc drives including magnetic discs, optical discs, tape drives, solid state drives and remote storage using network protocols (e.g. NFS, SMB or 9P clients); a display 903; and one or more input peripherals such as, but not limited to, a keyboard 905 for data/instruction entry. The host computer 900 is connected to a debug adaptor 909 via an interface 908 such as USB or Ethernet. The debug adaptor 909 is connected to the embedded system 911 via a debug link 910 typically JTAG or a NEXUS IEEE 5001 port.

With reference to FIG. 18 which illustrates code generation tool flow 600, computer programs are written as human-readable source code files 601, 604, using portable high-level languages (e.g. C or C++), with specialized low-level or performance critical functions written directly in assembly language specifically for the target processor on which they will execute. Each source code file contains a plurality of function definitions (each function consisting of a sequence of instructions intended to perform a specific effect), and a plurality of data definitions (each data item consisting of an area of memory containing specific values, which are read and written by the functions as they are executed). Code generation tools build executable files 610 from the source code files 601, 604, well-known examples being the GNU Compiler Collection (GCC) used with GNU Binutils, and the CLANG compiler front-end used with the LLVM Compiler Infrastructure. A compiler tool 602 translates a portable high-level language source code file 601 into an intermediate representation and applies some general high-level optimizations, then outputs an assembly language source file 603 specific to a particular processor (or abstract processor). An assembler tool 605 translates a human-readable assembly source code 603, 604 into a non-human readable form known as an object file 606. A librarian tool 607 allows multiple object files 606 to be combined into a single library file 608. A linker tool 609 combines multiple object files 606 and library files 608 into a single executable file 610. The linker stage 609 is the only point which has visibility of the whole program. Using library files make the programmer's job simpler as there are fewer individual files to specify and is also a popular method to distribute software components (e.g. operating systems, networking protocol stacks, device drivers etc.).

In existing systems, compiler 602 optimizations are applied in the compiler front-end (which translates high level languages into an intermediate representation), middle-end (which operates entirely on the intermediate representation), and back-end (which generates target-specific instructions from the intermediate representation and makes limited target-specific instruction set optimizations such as peepholing and scheduling). The optimizations are made within individual source file, within the scope of individual functions and their associated data, and potentially across the scope of many functions and data items within a given compilation unit.

The method by which a computer program is structured into a number of separate source code files varies for a number of different reasons including the programmer's design choices, the organisational structure of a multi-person development teams, and re-use of existing software components. Traditional compiler technologies which process each source file one at a time (e.g. the GNU GCC compiler) are unable to perform many of these optimizations between functions whose body is not available at the point of compiling the caller function. This is best illustrated in FIG. 3. functionA (in file x.c) cannot optimize its relationship with any other functions (as they are all defined in separate files), functionB and functionD (in file y.c) cannot optimize their relationship with functionA or functionC as they are to be found in file x.c and file z.c respectively and thus not visible when file y.c is compiled. Furthermore, interactions with hardware structures such as the underlying memory system (102, 103, 104, 105, 109, 110, 111, 112) cannot be applied without whole-program scope.

Real-Time Behaviour

Real-time behaviour is an important characteristic in embedded system designs and is not well addressed by existing program generation techniques. BCET is a metric for Best Case Execution Time. WCET is a metric for Worse Case Execution Time. ACET is a metric for Average Case Execution Time.

Consider the instruction sequences shown in FIG. 4. The flows between instructions 300 to 309, 311 to 320, 322 to 329, 331 to 340, 342 to 343 and 344 to 345 are sequential and therefore have strong spatial locality. The time and energy taken to fetch these instructions from the I-Buffer should be highly deterministic, BCET and WCET for these sequences should be similar (other than some minor variation based on time to fetch the first instruction in each sequence into the I-Buffer). However, the flows between instructions 310 to 322, 330 to 342, 341 to 344 and 346 to 311 are non-sequential and therefore have weak spatial locality. The time and energy taken to fetch these instructions from the I-Buffer will be unpredictable. Furthermore the 'function call' instruction 310, 'then return from function call' instructions 321 and 346, the 'conditional branch' instruction 330 and the 'unconditional branch' instruction 341 will cause the I-Port 102 to fetch from addresses which do not necessarily follow the required instruction address sequence. This can result in unnecessary instruction fetches from other addresses into the I-Buffer 104, wasting time, energy and polluting its contents with instructions which are not required.

Thus BCET and WCET for the above instruction sequences are highly variable and increase ACET such that the overall system performance (such as CPU frequency, or bandwidth available through the memory system) must be increased over what is required for BCET to provide sufficient headroom for WCET. This further increases design complexity, and energy consumption of the system over what might actually be required.

In U.S. Pat. No. 5,212,794 a code generation technique is described. The code generation technique is implemented within the GCC compiler and the LLVM compiler and requires profiling feedback generated by execution of an instrumented program. U.S. Pat. No. 6,839,895 describes another code generation technique similarly requiring profiling information.

An approach for improving virtual memory mapping of a program is described in U.S. Pat. No. 6,292,934. The approach involves disassembling a program to identify its basic blocks (BB) and generating an instrumented version of the program which, when processed, reveals the frequency by which each block is executed.

Existing code generation techniques, such as those described above, require an instrumented executable to be created, executed and dynamic feedback produced (as shown in FIG. 19) and require re-compilation from source code. They use statistical information in order to optimize BCET or WCET for a specific execution path. Traditionally, code generation tools (such as the compiler, and even the GCC Whole Program Optimization (WHOPR) and Link Time Optimization (LTO) whole program generation technologies) are only aware of the CPU and so are unable to make the correct trade-offs to generate an optimal program for a given embedded processing system. Existing techniques also ignore the effects that code generation has on the target machine, attempting to generate optimal BCET for a given function may disturb the I-Buffer/D-Buffer state sufficiently that whole program's BCET is inferior.

Compiler Feedback

As shown in FIG. 19, existing software tools (such as those described in EP 0459192 and U.S. Pat. No. 6,317,874) may be used such that executing 810 an instrumented version of the executable file 809 generates profile data 811 describing its dynamic behaviour, which is processed 812 into a compiler feedback file 814 for use in building a revised version of the executable whose optimizations are tuned to the dynamic behaviours observed.

This approach has many problems. Firstly, profiler tools 812 are often unavailable, or are unsuitable for use on embedded processor systems, as they consume large amounts of memory in the target system, and alter the real-time behaviour such that the program may fail to execute correctly (these problems are known as temporal bugs). Secondly, this method requires a representative set of inputs to stimulate "typical" behaviour during the "training run". Thirdly, the information produced by the profiler 814, 815 explains which components consumed resources (such as time, or memory bandwidth), but not why this was so. The relationship between which and why is complex, and is frequently beyond the capabilities of even the most skilled programmers, and of existing software tools. This conflicts with the well known Pareto Principle which states that 80% of effects arise from 20% of the causes. For example, a function's execution may reveal in a large number of cache misses, but this could be because a previous function has disrupted the cache rather than the function itself not being cache-optimal. Correspondingly, programmers and existing optimization techniques move bottlenecks from one area to another in a complex and uncontrollable manner and are analogous to "balloon squeezing" (attempting to make a balloon smaller by squeezing it doesn't work—it just forces air from one part to another and squeezing too much may result in it bursting!). This wastes programmer's time, and can result in late, inefficient and even bug-ridden designs. Thirdly, the information generated is specific to a particular set of dynamic behaviours observed which may not exhibit typical behaviour (either due to the presence of the profiler altering its behaviour or due to the stimulus applied to the program).

Conventional optimizations (such as those described in Pettis' and Hansen's article "Profile Guided Code Positioning", Proceedings of ACM SIGPLAN 1990 conference) are used in the compiler to layout the Basic Blocks (BBs) and control flow according to estimated call frequencies to arrange the predicted normal flow in a straight-line sequence. "Procedure Placement using Temporal Ordering" by N. Gloy, Proceedings of Micro-30 conference 1997, describes a mechanism to order BBs to make use of target-specific I-Buffer and to avoid conflict between BB sequences in order to reduce I-Miss. Research such as "Cache-conscious data placement" (Calder et al., published in Proceedings of ASPLOS-VIII, 1998) attempts to reorder global data for better cache efficiency. However, all these require dynamic feedback, and still only consider BCET behaviour.

Existing static feedback techniques (such as those covered by U.S. Pat. No. 5,655,122) operate on the basis of branch probabilities and frequencies rather than cost. As they operate prior to target code generation and ignore target-specific effects they yield poor results and are also unable to cope with Real-Time Operating System (RTOS) related branches and context switches because they only consider traditional branch instructions. Other static techniques (U.S. Pat. No. 7,275,242, GB 2463942) examine a linked executable and generate information to feedback to the compiler and linker such that recompilation and re-linking should produce a more optimal program, whereas it would be more desirable to apply significant whole-program scope and target-specific optimizations when actually creating the original executable.

Unlike instruction fetch operations, the data read/write accesses performed by the program are typically directly related to the data structures which the program accesses. FIG. 10 shows a typical data structure definition, written in the C programming language for a machine on which "char" occupies 1 byte, "unsigned int" occupies 4 bytes, and each field within the structure must be aligned to a multiple of its size. exampleStruct defines a data structure comprising a 1-byte value (fooMask), an array of 65536 bytes (arrayOfValues), and a 1-byte unsigned value (barMask). It can be seen that that the spatial locality between individual ascending subscripts of arrayOfValues is strong, the spatial locality between fooMask and the lower subscripts of arrayOfValues is moderate (but not high due to the alignment padding at bytes 1 . . . 3), but the spatial locality between fooMask and barMask is low. If the program contains instruction sequences which more frequently access both fooMask and barMask than access adjacent fields of arrayOfValues, the D-Hit rate could be significantly improved if the spatial locality between fooMask and barMask was increased, i.e. by altering the structure definition to be as shown in FIG. 11.

Research such as "Cache-conscious structure definition" (Chilimbi et al., SIGPLAN Conference on Programming Language Design and Implementation, 1999) require dynamic feedback. They also ignore overall cache capability and only consider cache-line length to reorder fields. As alignment and cache sets aren't considered, rearranging fields for simple spatial locality may actually damage D-Miss.

Tools such as PAHOLE take an executable file 609 as input, and generate textual information which a programmer can review in order to potentially modify the program's source code files 601 to improve the memory layout of data structures. However, this approach is often impractical—developer productivity is already low and adding more manual modifications can only make it worse. Furthermore, data structures used in source code files 601, 604 and previously built library files 608 could become incompatible unless everything is re-compiled. Thus the application of such manually applied techniques is inherently time-consuming and risky.

Relative placement of global data can impact D-Miss ratio, and the cost of D-Miss operations (for example, performing a cache writeback of a D-Buffer stride where only part of the stride has changed is a worthless but necessary operation). Languages such as C support the notion of "const" data to denote the data is only read but not written, and such data is placed in a separate memory area to writable data. However, many global data items are written infrequently compared to others, and a placement where DATA (frequentlyWritten) and DATA (infrequentlyWritten) have strong spatial locality can perform unnecessary writebacks, damaging D-Hit ratio, and increasing the latency of D-Miss operations.

Existing Whole-Program Compilers

Seminal whole program compilation technologies (such as those described in EP 0464525, EP 0428084) have significant compatibility and scalability issues and have failed to become mainstream. Newer compiler technologies, such as GNU GCC's LTO and WHOPR, and the CLANG/LLVM compiler system intend to be more practical and can support inlining and inter-procedural optimizations irrespective of the source code's file structure. Rather than each compiler invocation outputting target-machine specific assembly code, the compiler's intermediate representation is output and the linker performs optimization across the whole-program's intermediate representation before generating target specific instructions. This approach has a number of issues. Tools are immature, operate slowly and consume large amounts of processor cycles, memory and disc space when building the program, limiting the opportunities for practical usage. The optimizations are still limited to source files compiled to intermediate file format and do not apply to normal objects/libraries holding target instructions (such as the libraries typically used to integrate with an operating system or middleware such as device drivers etc.). Exposing the whole-program to the compiler optimizer and can also provide catastrophic program size and performance regressions due to overzealous optimizations and the compiler's inaccurate target cost models (resulting in programs which are actually larger and slower than programs which are compiled a source file at a time in the conventional manner).

Existing Post-Executable Optimisers

Research into post-executable optimizers has attempted to find a practical alternative to whole-program compilation, though have failed to provide acceptable solutions.

Tools such as AiPop, EP 1497722, US 2005/0235268) input and output assembly language source files, and do not fit into a conventional code generation flow of compiler, assembler, linker, especially when externally supplied library files are required. Research tools such as Alto (R. Muth et al., "alto: A Link-Time Optimizer for the Compaq Alpha" (Software Practice and Experience, 2001), Spike (R. S. Cohn et al., "Optimizing Alpha Executables on Windows NT with Spike" (Digital Technical Journal, 1997) and Diabolo, and o U.S. Pat. No. 5,966,539 require a first executable file to be generated by a linker tool 609, try to re generate information discarded in the compilation process 602, and then generate a new optimized executable. Generating two executables (the first, and the optimized second) slows the build process and negatively impacts developer productivity. Run-time feedback from profiling tools is also required—often this is unavailable, or may be incorrect. Furthermore, post-executable optimizers often fail to recover sufficient information from the source code (such as the C language's volatile keyword) and thus can generate incorrectly optimized executables yielding bogus semantics compared to the first executable. Analysis of the compiler's assembly language output is used with pattern matching to identify call sequences (e.g. switch statements) and so optimizations are very sensitive to current compiler output. Features such as dynamic linking (whereby parts of the program's libraries files are bound to the executable at the point at which the operating system loads and starts to execute it) are often unsupported, even though such facilities are mandatory for many environments.

SUMMARY OF THE INVENTION

The present invention seeks to address the problems identified above with respect to existing software development kits, software development tools and the generation of new software.

The present invention also seeks to provide a software development tool, program instructions stored on a tangible medium, a method and a computer program for implementing the method that, during use, has lower requirements in respect of tangible resources in comparison with conventional software development kits performing equivalent functions.

The present invention further seeks to provide a software development tool, program instructions stored on a tangible medium, a method and a computer program for implementing the method adapted to generate executable software files that have improved real-time behaviour and lower processing power requirements in comparison to equivalent executable files produced using conventional software development kits.

In a first aspect the present invention provides a tangible medium storing computer readable instructions for use at the linker stage and adapted to improve the performance of an executable for a target computer system, the computer readable instructions comprising: instructions for receiving one or more of object files and library files and for analysing instruction sequences and data structures therein used in generation of the executable; instructions for determining one or more of: relationships between the instruction sequences; relationships between the data structures; and relationships between the instruction sequences and the data structures; instructions for re-sequencing one or more of: (i) at least one instruction sequence, and (ii) at least one data structure, to generate re-sequenced versions each re-sequenced version having a different set of at least one re-sequenced instruction sequence and/or data structure; instructions for determining statically for each re-sequenced version an Average Case Execution Time (ACET) with respect to one or more processors and one or more memories of a target computer system; instructions for selecting one of the re-sequenced versions based on its ACET; and instructions for generating an executable using one or more selected re-sequenced versions.

In a particularly preferred embodiment the instructions further comprise instructions for applying further optimizations following a second compilation and linking operation.

Also the computer-readable instructions may further comprise: instructions for determining for each re-sequenced version a Worse Case Execution Time (WCET) with respect to one or more processors and one or more memories of a target computer system; and wherein the instructions for selecting one of the re-sequenced versions is adapted to select based on a combination of the re-sequenced version's ACET and WCET.

Ideally, the instructions for determining relationships include instructions for identifying object file symbols referenced by the instruction sequences; and the instructions for re-sequencing include instructions for creating one or more basic blocks (BBs) within a plurality of functions (FNs) using the object file symbols.

The instructions for re-sequencing may include instructions for replacing a conditional branch instruction with an IF THEN ELSE instruction by merging at least two basic blocks (BBs) associated with the conditional branch instruction and removing their common EDGE. Also the instructions for analysing instruction sequences and data structures may include: instructions for identifying from the instruction sequences a plurality of basic blocks, each basic block consisting of one or more instructions with a single entry point and a single exit point, and a plurality of EDGEs, each EDGE consisting of a source basic block, a destination basic block, and an edgeType; and instructions for generating a new plurality of basic blocks and a new plurality of EDGEs having, with respect to the entirety of the executable, equivalent semantics to the basic blocks and EDGES of the original instruction sequences. The instructions for analysing instruction sequences and data structures may also further include: instructions for determining a function (FN) in a real-time operating system (RTOS) invoked when a system call instruction is executed; and instructions for representing EDGEs to system calls as direct branches.

Ideally the instructions for analysing instruction sequences and data structures include instructions for processing a plurality of basic blocks in parallel.

In a further embodiment the computer-readable instructions may further comprise: instructions for identifying debugging information entries to selectively disable re-sequencing of blocks containing volatile memory access instructions.

Additionally, the computer-readable instructions may further comprise: instructions for identifying DATA items associated only with load operations and for separately identifying DATA items associated with both load and store operations; and instructions for allocating data memory areas to DATA items associated only with load operations and for separately allocating data memory areas to DATA items associated with both load and store operations so as to reduce D-Miss occurrences and/or the time spent processing them.

The computer-readable instructions may also comprise instructions for identifying one or more unreferenced instruction sequences and for omitting identified unreferenced instruction sequences from the executable.

With one embodiment of the present invention the computer-readable instructions further comprise: instructions for receiving input from a programmer in the form of source code; instructions for translating the source code into an intermediate representation; and instructions for translating the intermediate representation into one or more object files to be received and analysed according to the instructions set out above.

The computer-readable instructions may further comprise: generating an assembly language source file from the intermediate representation, whereby the one or more object files are generated from the assembly language source file.

In a second aspect the present invention provides a computer system for use in improving executable software performance, the system comprising: at least one processor; software storage; and read/write memory, wherein the software storage contains computer-readable instructions for use at the linker stage and adapted to improve the performance of an executable for a target computer system, the computer-readable instructions comprising: instructions for receiving one or more of object files and library files and for analysing instruction sequences and data structures therein used in generation of the executable; instructions for determining one or more of: relationships between the instruction sequences; relationships between the data structures; and relationships between the instruction sequences and the data structures; instructions for re-sequencing one or more of: (i) at least one instruction sequence, and (ii) at least one data structure to generate re-sequenced versions each re-sequenced version having a different set of at least one re-sequenced instruction sequence and/or data structure; instructions for determining statically for each re-sequenced version an Average Case Execution Time (ACET) with respect to one or more processors and one or more memories of a target computer system; instructions for selecting one of the re-sequenced versions based on its ACET; and instructions for generating an executable using one or more selected re-sequenced versions.

The computer system may further comprise instructions for applying further optimizations following a second compilation and linking operation.

Moreover, the computer-readable instructions of the computer system may further comprise: instructions for determining for each re-sequenced version a Worse Case Execution Time (WCET) with respect to one or more processors and one or more memories of a target computer system; and instructions for selecting a re-sequenced version based on a combination of the re-sequenced version's respective ACET and WCET.

In a preferred embodiment the instructions for determining relationships include instructions for identifying in parallel object file symbols reference by the instruction sequences; and the instructions for re-sequencing including instructions for creating one or more basic blocks (BBs) within a plurality of functions (FNs) using the object file symbols.

Preferably, the instructions for re-sequencing include instructions for replacing a conditional branch instruction with an IF THEN ELSE instruction by merging at least two basic blocks (BBs) associated with the conditional branch instruction and removing their common EDGE.

Also the instructions for analysing instruction sequences and data structures may include: instructions for identifying from the instruction sequences a plurality of basic blocks, each basic block consisting of one or more instructions with a single entry point and a single exit point, and a plurality of EDGEs, each EDGE consisting of a source basic block, a destination basic block, and an edgeType; and instructions for generating a new plurality of basic blocks and a new plurality of EDGEs having, with respect to the entirety of the executable software, equivalent semantics to the basic blocks and EDGES of the original instruction sequences.

The instructions for analysing instruction sequences and data structures may additionally include: instructions for determining a function (FN) in a real-time operating system (RTOS) invoked when a system call instruction is executed; and instructions for representing EDGEs to system calls as direct branches.

In a particularly preferred embodiment the instructions for analysing instruction sequences and data structures include instructions for processing a plurality of basic blocks in parallel.

Optionally, the computer-readable instructions may further comprise: instructions for identifying debugging information entries to selectively disable re-sequencing of blocks containing volatile memory access instructions.

Also, the computer-readable instructions further comprise: instructions for identifying DATA items associated only with load operations and for separately identifying DATA items associated with both load and store operations; and instructions for allocating data memory areas to DATA items associated only with load operations and for separately allocating data memory areas to DATA items associated with both load and store operations so as to reduce D-Miss recurrence and/or the time spent processing them.

The computer-readable instructions may additionally comprise instructions for identifying one or more unreferenced instruction sequences and for omitting identified unreferenced instruction sequences from the executable.

In an embodiment of the present invention the computer-readable instructions further comprise: instructions for receiving input from a programmer in the form of source code; instructions for translating the source code into an intermediate representation; and instructions for translating the intermediate representation into one or more object files to be received and examined according to the instructions set out above. With this embodiment the computer-readable instructions may further comprise: generating an assembly language source file from the intermediate representation, whereby the one or more object files are generated from the assembly language source file.

In a third aspect the present invention provides a software development kit for execution on computer hardware, the software development kit comprising a tangible medium storing computer readable instructions for use in improving performance of an executable as set out above.

In a fourth aspect the present invention provides a method for improving the performance of an executable during generation of the executable, the method comprising the following steps: analysing instruction sequences and data structures used in generation of the executable; determining one or more of: relationships between the instruction sequences; relationships between the data structures; and relationships between the instruction sequences and the data structures; re-sequencing one or more of: (i) at least one instruction sequence and (ii) at least one data structure to generate re-sequenced versions each re-sequenced version having a different set of at least one re-sequenced instruction sequence and/or data structure; for each re-sequenced version determining statically an Average Case Execution Time (ACET) with respect to one or more processors and one or more memories of a target computer system; selecting one of the re-sequenced versions based on its respective ACET; and generating an executable using one or more selected versions.

The method may include applying further optimizations following a second compilation and linking operation.

Optionally the method may further comprise the steps of: determining, for each re-sequenced version, a Worse Case Execution Time (WCET) with respect to one or more processors and one or more memories of a target computer system; and selecting one of the re-sequenced versions based on a combination of the re-sequenced version's respective ACET and WCET.

In a preferred embodiment the step of determining relationships includes identifying in object file symbols reference by the instruction sequences; and the step of re-sequencing includes creating one or more basic blocks (BBs) within a plurality of functions (FNs) using the object file symbols.

Also the step of re-sequencing may include replacing a conditional branch instruction with an IF THEN ELSE instruction by merging at least two basic blocks (BBs) associated with the conditional branch instruction and removing their common EDGE.

Furthermore the step of analysing instruction sequences and data structures may include: identifying from the instruction sequences a plurality of basic blocks, each basic block consisting of one or more instructions with a single entry point and a single exit point, and a plurality of EDGEs, each EDGE consisting of a source basic block, a destination basic block, and an edgeType; and generating a new plurality of basic blocks and a new plurality of EDGEs having, with respect to the entirety of the executable software, equivalent semantics to the basic blocks and EDGES of the original instruction sequences.

The step of analysing instruction sequences and data structures may additionally include: determining a function (FN) in a real-time operating system (RTOS) invoked when a system call instruction is executed; and representing EDGEs to system calls as direct branches.

In a particularly preferred embodiment the instructions for analysing instruction sequences and data structures includes instructions for processing a plurality of basic blocks in parallel.

Optionally the method may further comprise: identifying debugging information entries to selectively disable re-sequencing of blocks containing volatile memory access instructions.

The method may also further comprise: identifying DATA items associated only with load operations and for separately identifying DATA items associated with both load and store operations; and allocating data memory areas to DATA items associated only with load operations and for separately allocating data memory areas to DATA items associated with both load and store operations so as to reduce D-Miss occurrences.

In a preferred embodiment the method further comprises: receiving input from a programmer in the form of source code; translating the source code into an intermediate representation; and translating the intermediate representation into one or more object files to be received and examined according to the method steps set out above. The method may also comprise the step of generating an assembly language source file from the intermediate representation, whereby the one or more object files are generated from the assembly language source file.

In a fifth aspect the present invention provides a tangible medium storing computer readable instructions for use at the linker stage and adapted to improve the performance of an executable for a target computer system, the computer readable instructions comprising: instructions for receiving at least one object file, the object file containing one or more sequences of instructions and one or more data definitions of predetermined memory areas; instructions for analysing the at least one object file to determine one or more of: relationships between the object file sequences of instructions; relationships between the data definitions of predetermined memory areas; and relationships between the object file sequences of instructions and the data definitions of predetermined memory areas; instructions for generating statically data representative of one or more altered data definitions and for communicating the altered data definitions to a compiler stage; instructions for receiving one or more replacement object files based on the data representative of one or more altered data definitions; and instructions for generating an executable with the one or more replacement object.

Ideally the computer-readable instructions further include: instructions for iteratively repeating the generation statically of data representative of one or more altered data definitions and the receipt of one or more replacement object files.

Optionally the computer-readable instructions may further include: instructions for receiving input from a programmer in the form of source code; instructions for translating the source code into an intermediate representation at the compiler stage; and instructions for translating the intermediate representation into one or more object files.

In a particularly preferred embodiment the computer-readable instructions further comprise: instructions for re-sequencing one or more of the sequences of instructions and the data definitions of predetermined memory areas to generate a plurality of re-sequenced versions each re-sequenced version having one or more differently re-sequenced instructions and/or data definitions of predetermined memory areas; instructions for determining statically, for each re-sequenced version, an Average Case Execution Time (ACET) with respect to one or more processors and one or more memories of a target computer system; instructions for selecting one of the re-sequenced versions based on their respective ACET; and instructions for generating an executable using one or more of the selected versions.

Optionally the computer-readable instructions further comprise: instructions for determining statically, for each re-sequenced version, a Worse Case Execution Time (WCET) with respect to one or more processors and one or more memories of a target computer system; and instructions for selecting one of the re-sequenced versions based on a combination of its respective ACET and WCET.

Preferably the instructions for analysing the at least one object file include instructions for identifying in parallel object file symbols referenced by the sequences of instructions; and the instructions for re-sequencing include instructions for creating one or more basic blocks (BBs) within a plurality of functions (FNs) using the object file symbols.

Also the instructions for re-sequencing may include instructions for replacing a conditional branch instruction with an IF THEN ELSE instruction by merging at least two basic blocks (BBs) associated with the conditional branch instruction and removing their common EDGE.

Preferably the instructions for analysing the at least one object file includes: instructions for identifying from the sequences of instructions a plurality of basic blocks, each basic block consisting of one or more instructions with a single entry point and a single exit point, and a plurality of EDGEs, each EDGE consisting of a source basic block, a destination basic block, and an edgeType; and instructions for generating a new plurality of basic blocks and a new plurality of EDGEs having, with respect to the entirety of the executable, equivalent semantics to the basic blocks and EDGES of the original sequences of instructions.

The instructions for analysing the at least one object file may further include: instructions for determining a function (FN) in a real-time operating system (RTOS) invoked when a system call instruction is executed; and instructions for representing EDGEs to system calls as direct branches.

In a particularly preferred embodiment the instructions for analysing the at least one object file includes instructions for processing a plurality of basic blocks in parallel.

Optionally the computer-readable instructions further comprise: instructions for identifying debugging information entries to selectively disable re-sequencing of blocks containing volatile memory access instructions.

The computer-readable instructions may additionally comprise: instructions for identifying DATA items associated only with load operations and for separately identifying DATA items associated with both load and store operations; and instructions for allocating data memory areas to DATA items associated only with load operations and for separately allocating data memory areas to DATA items associated with both load and store operations so as to reduce D-Miss occurrence.

In a sixth aspect the present invention provides a computer system for use at the linker stage and adapted to improve the performance of an executable for a target computer system, the system comprising: at least one processor; software storage; and read/write memory, wherein the software storage contains computer-readable instructions for improving the performance of executable software, the computer-readable instructions comprising: instructions for receiving at least one object file, the object file containing one or more sequences of instructions and one or more data definitions of predetermined memory areas; instructions for analysing the at least one object file to determine one or more of: relationships between the object file sequences of instructions; relationships between the data definitions of predetermined memory areas; and relationships between the object file sequences of instructions and the data definitions of predetermined memory areas; instructions for generating statically data representative of one or more altered data definitions and for communicating the altered data definitions to a compiler stage; instructions for receiving one or more replacement object files based on the data representative of one or more altered data definitions; and instructions for generating an executable with the one or more replacement object files.

Ideally the computer-readable instructions further include: instructions for iteratively repeating the generation statically of data representative of one or more altered data definitions and the receipt of one or more replacement object files.

In a preferred embodiment the computer-readable instructions further include: instructions for receiving input from a programmer in the form of source code; instructions for translating the source code into an intermediate representation at the compiler stage; and instructions for translating the intermediate representation into one or more object files.

In a particularly preferred embodiment the computer-readable instructions further comprise: instructions for re-sequencing one or more of the sequences of instructions and the data definitions of predetermined memory areas to generate re-sequenced versions each re-sequenced version having one or more differently re-sequenced instructions and/or data definitions of predetermined memory areas; instructions for determining statically, for each re-sequenced version, an Average Case Execution Time (ACET) with respect to one or more processors and one or more memories of a target computer system; instructions for selecting one of the re-sequenced versions based on its respective ACET; and instructions for generating an executable using one or more selected versions.

Optionally the computer-readable instructions may further comprise: instructions for determining statically, for each re-sequenced version, a Worse Case Execution Time (WCET) with respect to one or more processors and one or more memories of a target computer system; and instructions for selecting one of the re-sequenced versions based on a combination of its respective ACET and WCET.

In a preferred embodiment the instructions for analysing the at least one object file include instructions for identifying in parallel object file symbols referenced by the sequences of instructions; and the instructions for re-sequencing include instructions for creating one or more basic blocks (BBs) within a plurality of functions (FNs) using the object file symbols.

The instructions for re-sequencing may include instructions for replacing a conditional branch instruction with an IF THEN ELSE instruction by merging at least two basic blocks (BBs) associated with the conditional branch instruction and removing their common EDGE.

Also the instructions for analysing the at least one object file may include: instructions for identifying from the sequences of instructions a plurality of basic blocks, each basic block consisting of one or more instructions with a single entry point and a single exit point, and a plurality of EDGEs, each EDGE consisting of a source basic block, a destination basic block, and an edgeType; and instructions for generating a new plurality of basic blocks and a new plurality of EDGEs having, with respect to the entirety of the executable software, equivalent semantics to the basic blocks and EDGES of the original sequences of instructions.

Moreover, the instructions for analysing the at least one object file may further include: instructions for determining a function (FN) in a real-time operating system (RTOS) invoked when a system call instruction is executed; and instructions for representing EDGEs to system calls as direct branches.

In a particularly preferred embodiment the instructions for analysing the at least one object file includes instructions for processing a plurality of basic blocks in parallel.

Optionally the computer-readable instructions may further comprise: instructions for identifying debugging information entries to selectively disable re-sequencing of blocks containing volatile memory access instructions.

Preferably the computer-readable instructions further comprise: instructions for identifying DATA items associated only with load operations and for separately identifying DATA items associated with both load and store operations; and instructions for allocating data memory areas to DATA items associated only with load operations and for separately allocating data memory areas to DATA items associated with both load and store operations so as to reduce D-Miss occurrence.

In an seventh aspect the present invention provides a software development kit for execution on computer hardware, the software development kit comprising a tangible medium storing computer readable instructions for use in improving performance of executable software as set out above.

In a eight aspect the present invention provides a method for improving the performance of an executable for a target computer system during generation of the executable, the method comprising the following steps: receiving at least one object file, the object file containing one or more sequences of instructions and one or more data definitions of predetermined memory areas; analysing the at least one object file to determine one or more of: relationships between the object file sequences of instructions; relationships between the data definitions of predetermined memory areas; and relationships between the object file sequences of instructions and the data definitions of predetermined memory areas; generating statically data representative of one or more altered data definitions and for communicating the altered data definitions to a compiler stage; receiving one or more replacement object files based on the data representative of one or more altered data definitions; and generating an executable using the one or more replacement object files.

Ideally the method further comprises: iteratively repeating the generation statically of data representative of one or more altered data definitions and the receipt of one or more replacement object files.

In a preferred embodiment the method further comprises: receiving input from a programmer in the form of source code; translating the source code into an intermediate representation by a compiler; and translating the intermediate representation into one or more object files.

Preferably the method further comprises: re-sequencing one or more of the sequences of instructions and the data definitions of predetermined memory areas to generate a plurality of re-sequenced versions each re-sequenced version having a different set of re-sequenced instructions and/or data definitions; for each re-sequenced version, determining statically an Average Case Execution Time (ACET) with respect to one or more processors and one or more memories of a target computer system; selecting one of the re-sequenced versions based on its respective ACET; and generating an executable using one or more selected versions.

Optionally the method further comprises: determining, for each re-sequenced version, a Worse Case Execution Time (WCET) with respect to one or more processors and one or more memories of a target computer system; and selecting one of the re-sequenced versions based on a combination of its respective ACET and WCET.

Ideally the step of analysing the at least one object file includes identifying in parallel object file symbols referenced by the sequences of instructions; and the step of re-sequencing includes creating one or more basic blocks (BBs) within a plurality of functions (FNs) using the object file symbols.

Preferably the step of re-sequencing includes replacing a conditional branch instruction with an IF THEN ELSE instruction by merging at least two basic blocks (BBs) associated with the conditional branch instruction and removing their common EDGE.

More preferably the step of analysing at least one object file includes: identifying from the sequences of instructions a plurality of basic blocks, each basic block consisting of one or more instructions with a single entry point and a single exit point, and a plurality of EDGEs, each EDGE consisting of a source basic block, a destination basic block, and an edgeType; and generating a new plurality of basic blocks and a new plurality of EDGEs having, with respect to the entirety of the executable, equivalent semantics to the basic blocks and EDGES of the original sequences of instructions.

More preferably still the step of analysing the at least one object file further includes: determining a function (FN) in a real-time operating system (RTOS) invoked when a system call instruction is executed; and representing EDGEs to system calls as direct branches.

In a particularly preferred embodiment the instructions for analysing sequences of instructions and data structures includes instructions for processing a plurality of basic blocks in parallel.

Optionally the method may further comprise: instructions for identifying debugging information entries to selectively disable re-sequencing of blocks containing volatile memory access instructions.

The method may additionally comprises: identifying DATA items associated only with load operations and for separately identifying DATA items associated with both load and store operations; and allocating data memory areas to DATA items associated only with load operations and for separately allocating data memory areas to DATA items associated with both load and store operations so as to reduce D-Miss occurrence.

With the present invention, as shown in FIG. 20, the software development tool replaces a conventional non-optimising linker with a re-sequencing linker for generating an improved, preferably optimized, executable.

With the present invention an optimized executable is generated that is semantically equivalent to the input instruction sequences but has different characteristics such as, but not limited to, size/layout of instructions and data structures in memory, and the number and type of instructions in each sequence. The optimized executable offers one or more of the following benefits: achieves the same semantic effects; requires less programmer resource and effort to produce; requires no modifications to the source code; executes in less time; executes more deterministically with improved WCET and ACET; executes using a lower processor and memory frequency; consumes less energy in the process and memory system; performs a lesser number of memory accesses causing a reduction in required memory bandwidth; provides more tolerance to memory latency; and can utilize a device's support for Non-uniform Memory Architecture (NUMA) without requiring the program's source code to be modified.

With the first to fourth aspects of the present invention instructions are arranged to reduce ACET and optionally WCET, even if this causes a minor increase in theoretical BCET. Moreover, optimizing for ACET can also reduce the memory bandwidth required. This enables the use of slower, simpler (and potentially cheaper) memories.

Moreover, in accordance with the first to fourth aspects of the present invention, favouring improvements in ACET over improving BCET offers much better real-world results in terms of achieved performance, system efficiency and energy efficiency. Optimal BCET and ACET require the code generation strategy to be aware of the details of the processor's pipeline, its memory system and the associated latencies and costs. FIG. 12 illustrates the extent to which these features of the processor's pipeline are highly specific to the entire processing system (they are dependent upon the properties of the I-Port, I-Buffer, the on-chip memories, the off-chip memory controller, and the off-chip memories).

The present invention's re-sequencing techniques are applied after the conventional code generation tools have applied optimization techniques, and the present invention's re-sequencing optimizations utilize finer grain analysis of interactions between the software, the processor pipeline and the memory system to provide real-world performance and efficiency optimizations.

The inherent ease of use, compatibility and stability advantages of the present invention allows it to be used by all engineers through the software development process (rather than just in a final optimization stage). This can directly improve developer productivity, and the development effort to generate a program correct for all dynamic behaviour (due to a reduction in temporal bugs through improvements in run-time determinism and reductions in WCET and ACET.

In contrast to existing source optimizers (such as aiPop) and post-link executable optimizers (such as Alto, PLTO, Diabolo, ISpike), the present invention's optimizations are applied at the point at which the executable is generated. Moreover the present invention does not require profiler feedback (which would involve the program being executed and profiling data generated) and thus the present invention works within conventional code-generation flow without requiring modifications to the method by which the software is built.

In contrast to existing post-link executable optimizers (such as Alto, PLTO, Diabolo, ISpike), the present invention's optimizations are directly applied as part of the normal process of generating the executable, saving developer time and resources by directly generating an optimized executable (rather than generating an un-optimized executable and subsequently discarding it). Additionally, as the underlying object and library files are used as input (as opposed to a previously generated executable) more information is available to accurately apply optimizations, providing a wide scope of application and avoiding applying optimizations which could introduce functional errors.

Moreover the present invention offers a further advantage in that the method by which the optimizations are applied to individual object and library files in the linker is highly efficient, and can straightforwardly be executed using a plurality of parallel execution threads, thus requiring less time and resources to generate the optimized executable making application of the optimization practical.

This method entails techniques used within the linker to optimize components of the program such as individual files and individual function/data items within each file. It allows a wider range of optimizations to be applied without adversely affecting time taken to generate the executable.

It also allows the debugging information recorded in the object/library files to be re-generated in the presence of optimizations.

This method also entails optional modifications to the compiler and assembler to generate additional information to be stored in the generated files which when consumed can further accelerate the linker's operation.

In contrast to the present invention which can statically generate information to be consumed by the compiler related to a data structure's optimal layout, tools such as PAHOLE generate human-readable information on the "ideal" layout of data structures, requiring the programmer to manually modify the program's source code.

According with the fifth to eigth aspects of the present invention the object and library files are combined into an optimized executable in a manner that enables compiler feedback files to be generated statically. This enables automatic consumption by the compiler such that, when re-compiled, the output can be further optimized. Additionally, in the process of generating the optimized executable a report can be generated on the optimizations performed and hints to the programmer for source code changes that would enable further optimization.

BRIEF DESCRIPTION OF THE DRAWINGS

Embodiments of the invention will now be described by way of example only with reference to the accompanying drawings, in which:

FIG. 3 illustrates a conventional C program call graph;

FIG. 4 is an example of software instructions sequences;

FIG. 5 illustrates a C language branching function with two alternate ARM® V7-M implementations;

FIG. 7 illustrates branch instruction flow and BCET/WCET for FIG. 5;

FIG. 8 illustrates predicated instruction flow and BCET/WCET for FIG. 5;

FIG. 9 illustrates a C language constant forming function with two alternate ARM® V7-M implementations in accordance with the present invention;

FIG. 10 illustrates a C language structure definition (unoptimized);

FIG. 11 illustrates the C language structure definition of FIG. 10 optimised in accordance with the present invention;

FIG. 12 illustrates conventional ARM® Cortex™ models, pipeline stages and branch prediction capabilities;

FIG. 13 illustrates wob( ) BB structure, C source (built with arm-none-eabi-gcc-mthumb-mcpu=cortex-m3), and disassembly in accordance with the present invention;

DETAILED DESCRIPTION OF EXEMPLARY EMBODIMENTS

Overview

Figure 1:
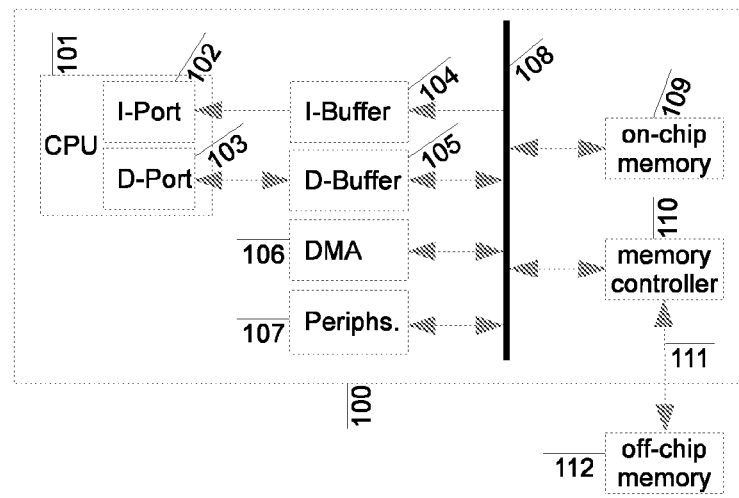
FIG. 1 is an illustration of conventional chip functionality.

For purposes of this detailed description, it is to be understood that reference herein to "re-sequencing" is to be understood as reference to altering the order or sequence of individual instructions and data structure in a software program that are to be performed by one or more processors. Reference to "re-sequencing" is also intended to include commensurate changes to the instructions themselves to ensure internal consistency of the software program. Also the term "Basic block" refers to, for example, a series of one or more machine instructions having one and only one entrance instruction, i.e., where control enters the block, and one and only one exit instruction, i.e., where control exits the block. The identification of basic blocks within a computer program will be discussed below in more detail. "Placement order" refers to the order of basic blocks within a computer program. Furthermore, reference herein to the software development tool "statically" generating data to be fed back to the compiler is intended to encompass static program analysis in which the need for the executable to be generated and tested using samples is avoided and is in contrast to the generation of feedback data dynamically (in which the executable is generated and run with test samples).

Before describing in detail exemplary embodiments, it should be noted that the embodiments reside primarily in combinations of method steps and apparatus components for improving and preferably optimizing software performance. Accordingly, the method steps and apparatus components have been represented, where appropriate, by conventional symbols in the drawings, showing only those specific details that are pertinent to understanding the exemplary embodiments and for the sake of clarity omitting features that will be readily apparent to those of ordinary skill in the art having the benefit of the description herein. Furthermore, for the sake of clarity different reference numerals are used for the components and methods illustrated in the various exemplary embodiments. This is not intended to imply that the individual components or method steps illustrated in the exemplary embodiments are specific to that embodiment alone and/or that the components and method steps are in any way different from the same or equivalent components and methods in other exemplary embodiments. Indeed, certain components and method steps are common to more than one of the exemplary embodiments and, where appropriate, the same reference numeral has been used. It is envisaged that components and method steps described in one of the exemplary embodiments may, in certain circumstances, be utilized or implemented in other of the exemplary embodiments.

It will be appreciated that the exemplary embodiments described herein may be comprised of one or more conventional processors and unique stored program instructions that control the one or more processors to implement, in conjunction with certain non-processor circuits, some, most, or all of the functions for providing software performance optimization. The non-processor circuits may include, but are not limited to, signal drivers, clock circuits, power source circuits, and user input devices. As such, these functions may be interpreted as steps of a method to perform operations for providing software performance optimization. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, when guided by the concepts and principles disclosed herein, will be readily capable of generating such software instructions and programs and ICs with minimal experimentation.

Figure 2:
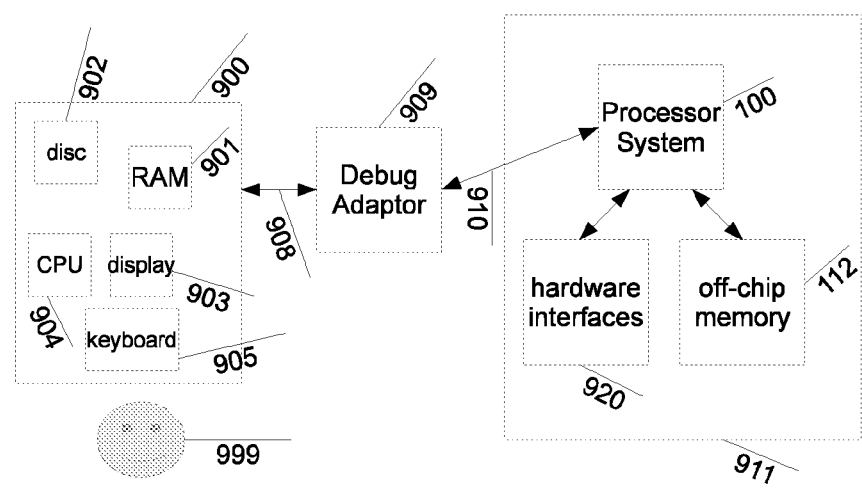
FIG. 2 illustrates a conventional hardware functional structure employed in software development.

In describing the software development tool and all of its attendant advantages, it is to be understood that the software development tool is particularly suited for use in optimizing software which is to be executed on the same or similar hardware structure to that illustrated in FIG. 1. Similarly, the software development tool is intended to be executed on the same or similar hardware to that illustrated in FIG. 2. Moreover, examples of processors and memories provided in relation to the hardware of FIG. 1 are also applicable to the hardware illustrated in FIG. 2 both for the target system but also the host hardware (i.e. the hardware on which the software development tool is executed).

The software development tool described herein uses whole program and whole target (processor and device-specific I-Buffer/D-Buffer) knowledge to optimize for memory accesses, ACET and energy. The software development tool is best applied directly when linking together objects and libraries into an executable file as opposed to post-processing an existing executable file. The reason for this is that applying the software development tool directly during generation of the executable file removes the need to generate an initial executable file which would subsequently be discarded. Furthermore, applying whole-program optimizations whilst generating the executable can perform optimizations more efficiently than conventional post-processing schemes which attempt to recover source-code information from an unoptimized executable file. In addition, the correctness of optimizations applied using this software development tool can be ensured by re-using source-code information conventionally provided in the object/library files. Furthermore, as the software development tool applies optimizations at the level of target-specific instructions, it can also be applied to object files which are generated directly from assembly language source code and also to library files expressed in target-specific instructions. This software development tool additionally has knowledge of low-level target-specific instruction sequences corresponding to RTOS-level operations and thus is able to optimize with knowledge of threading and context switch operations.

Figure 18:
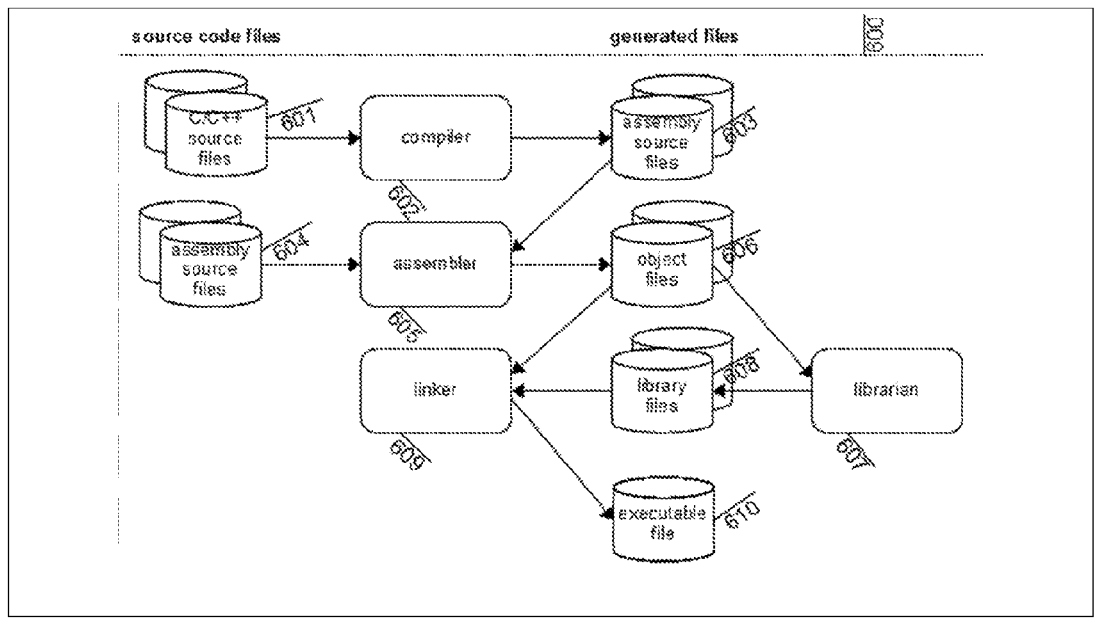
FIG. 18 illustrates a conventional code generation tool flow.
Figure 20:
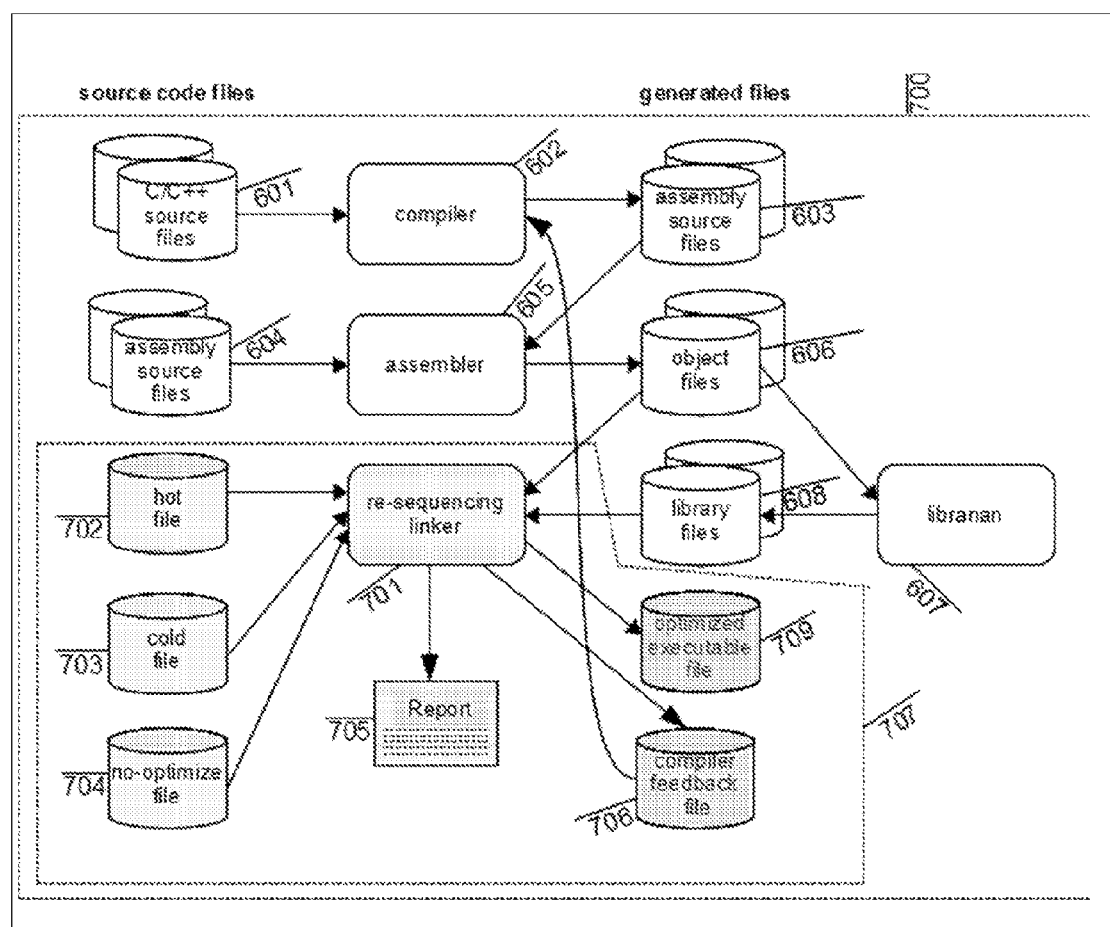
FIG. 20 illustrates a code generation tool flow with re-sequencing linker in accordance with the present invention.

FIG. 20 shows the automated functional flow and structure of the computer programs which, when executed, function as a software development kit and which incorporates the software development tool described herein. It is analogous to the traditional flow shown in FIG. 18 but replaces the traditional linker (609) with the software development tool in the form of a re-sequencing linker (701). Existing compiler (602) and assembler (605) tools are used unaltered. Furthermore, previously generated assembly source files (603), object files (606) and library files (608) may be used and are also subjected to re-sequencing optimizations. As the software development tool operates at the linker stage it 'sees' the whole program in the form of the object files and library files it receives which make up the program. This also means that the software development tool optimizes the executable during generation of the executable. In other words the software development tool avoids the need for a preliminary version of the executable to be generated which is only subsequently optimized.

Object files (606), library files (608) and executable files (609) are preferably in a well defined format (such as, but not limited to, ELF Executable and Linker Format. Other formats implementing object file symbols may also be used). They may also contain debugging information in a well defined format such as DWARF.

The re-sequencing linker (701) operates to combine multiple object files (606) and library files (608) into a single executable file (709) and performs optimizations across the scope of the whole program such that the target processor used to execute the program has more deterministic behaviour, performs less memory accesses, consumes less energy and operates more quickly than the unoptimized executable (610). Additional input files to specify which functions are frequently executed (702), infrequently executed (703) and which should not be optimized (704) are not necessarily required, but can be used to allow fine-grain control over the optimization process. Examples of infrequently executed functions include assertion checks and error handlers.

A human-readable report (705) can be optionally generated to describe the re-sequencing optimizations performed, and may contain "hints" to the programmer explaining why certain parts of the program's source (601, 604) are sub-optimal. This creates the opportunity for the programmer to choose to modify the source code (601).

The software development tool is also adapted to generate a compiler feedback file (706) which is analogous to the feedback file (814, FIG. 19) generated via dynamic execution of an executable file (709) to produce a revised program, which theoretically behaves more optimally for the dynamic behaviours previously observed by the profiler. Statically generating this file avoids significant issues with existing methods and generates information gleaned from inspection of the whole-program, not just individual parts.

Implementation

Re-sequencing for automated optimization involves generating an executable by processing the object and library files used to form it, each containing a plurality of data items (DATA), a plurality of functions (FN), each FN consisting of a plurality of basic blocks (BB), each BB consisting of a plurality of instructions, with a single entry point, and a single exit point such that all instructions within a BB are executed sequentially. A BB may access known global items of DATA by forming addresses and then performing load or store operations to those addresses. BBs are connected via a plurality of EDGEs forming the Control Flow Graph (CFG) showing the total set of control flows through the BBs caused.

Each EDGE consists of a source BB (srcBB), a destination BB (dstBB) and edgeType e.g. EDGE_DIRECT_FNENTRY (a function call where dstBB can be determined by examining a constant or an instruction sequence which generated a constant address), EDGE_INDIRECT_FNENTRY (a function call where dstBB cannot be determined statically), EDGE_INDIRECT_FNEXIT (a function return), EDGE_{DIRECT/INDIRECT}_CONDITIONAL (a conditional branch where the dstBB is implicit in the instruction/is held in a register and cannot be determined statically), EDGE_{DIRECT/INDIRECT}_UNCONDITIONAL (as previous but the branch will always be taken), EDGE_INDIRECT_SYSCALL (a system call, more expensive than a function call or branch), EDGE_DIRECT_LOOP (where it is known that a loop occurs), EDGE_FALLTHRU where the first instruction of dstBB is located immediately after the last instruction in srcBB.

Figure 14:
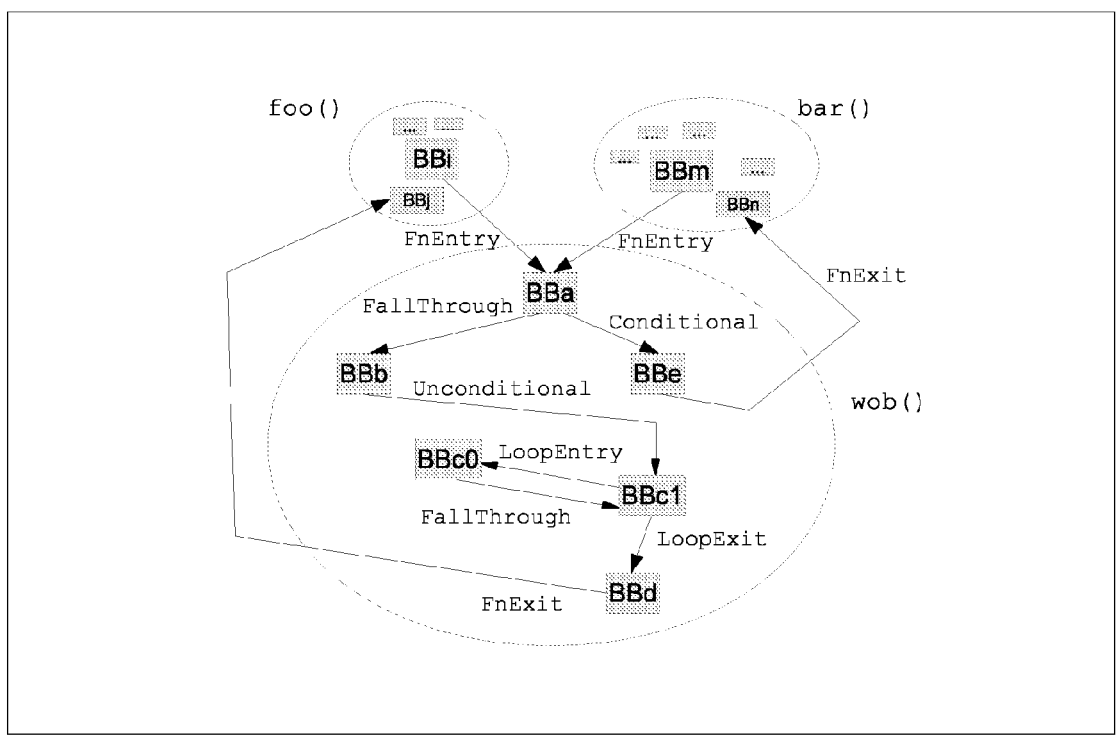
FIG. 14 illustrates some basic blocks and edges.

FIG. 14 shows foo (block BBi) and bar (block BBm) both call wob (block BBa) which has 2 exit blocks (BBd and BBe). In the general case, both BBd and BBe should have EDGEs to foo (block BBj) and bar (block BBn). However in this example the arguments passed from BBi and BBm to the conditional instruction in BBa are such that the precise control flow can be fully determined. FIG. 13 shows the source code for wob, corresponding basic blocks (BB*) and the resulting assembly code and symbol table.

With the software development tool the relationships between instructions in each BB and DATA are automatically sequenced (without programmer intervention) to provide knowledge of their semantics and their interaction with the target processor and memory system(s). They are then re-sequenced into a new set of instructions, potentially altering the content and size of each BB, and the ordering of BBs and DATA in memory such that when executed, the program provide equivalent semantics to the original, but has different properties (such as number, type and pattern of accesses to the memory system, instruction flow through the processor's pipeline etc.) resulting in increased performance, lower-energy usage, and more deterministic behaviour.

The re-sequencing method consists of the following computer automated steps:

| Step 1 | The compiler and assembler are configured to generate and preserve local labels (such as .L3, .L4, .L5 in FIG. 13). Source code is compiled/assembled into object files in the conventional manner. |
| --- | --- |
| Step 2 | Initialize, identify BBs and group into FNs |
| Step 3 | Disassemble, split blocks and create EDGEs |
| Step 4 | Prevent bogus optimizations |
| Step 5 | Transform BBs using prediction |
| Step 6 | Perform intra-BB optimizations and BB/data optimizations |
| Step 7 | Generate per-BB cost information |
| Step 8 | Identify DATA and BB relationships |
| Step 9 | Perform intra-BB optimizations |
| Step 10 | Calculate FN/BB ordering |
| Step 11 | Calculate DATA ordering |
| Step 11 | Resolve symbols to addresses and re-optimize BB instruction sequences |
| Step 12 | Re-generate debug information and output the executable file |
| Step 13 | Generate feedback for re-compilation |
| Step 14 | Generate report |
| Step 15 | Re-generate debug information and output the executable file |

Step 2—Initialize, Identify BBs and Group into FNs

Conventional algorithms to identify basic blocks require target-specific disassembly of all instructions (which is costly due to the sparse nature instruction encoding), and must be processed sequentially due to variable-sized instructions. The following provides the fine grain automated method steps of Step 2:

Step 2.1: Create and initialize empty lists of ELF symbols, BBs, FNs, DATAs and EDGEs.

Step 2.2: Iterate over the ELF file's symbol table, extracting ELF symbols which reference the ELF .text section, recording the symbol type (local label, function label etc.), the ELF section offset and marking each symbol as not yet referenced.

Step 2.3: Iterate over the ELF .text relocation section and mark all corresponding ELF symbols as referenced. Iterate over the ELF symbols deleting all unreferenced symbols.

Step 2.4: Sort the ELF symbols according to their ELF section offset to generate a complete sequentially ordered set of symbols within the .text section which are referenced by instructions.

Step 2.5: Iterate across the ELF symbols, creating a FN for each function label, creating BBs within each FN between the previously seen address and current symbol address. After processing the last symbol create a final BB from the last ELF symbol to the end of the section. At the end of this step a list of FNs and list of BBs which make up each FN has been generated.

Step 3—Disassemble, Split BBs and Create Edges

This step requires target-processor specific knowledge to disassemble the instructions and their operands. Due to the dense nature of instruction encoding this can be an expensive operation, but as the outer BB structure is already determined, each BB is independent and can be processed in parallel. This is a significant advantage over existing methods as it enables the software development tool to perform its operation automatically and in a timely manner, using less machine resources. If executed in parallel, it is either necessary to create locks around updates to common data structures such as bbList and edgeList, or to use separate lists and merge them once every thread has completed.

Another novel feature of the software development tool is the inclusion of RTOS specific awareness when creating EDGEs, this information is not normally visible as the disassembly does not contain direct calls to RTOS functions. By tracking simple instruction sequences (e.g. ARM® SVC#0 instructions preceding by MOVI instructions with the R7 register as destination) it is possible to determine the FN in the RTOS which would be invoked when the system call instruction (ARM® SVC instruction) is executed according to the value in R7. This allows EDGEs to system calls to be represented as if they were direct branches, permitting subsequent RTOS-specific optimizations.

Step 3.1: Iterate over all the BBs applying the automated steps below

Step 3.1.1: Initialize the BBs properties including its byte size determined by the end and start ELF offsets used when creating it; the number of instructions (not directly related to byte size as some instructions are variable size); an empty list of instructions in the BB.

Step 3.1.2: Iterate from the start to the end of the BB, disassembling each instruction, updating the BB's information (number of instructions, bitmap of which registers are written, bitmap of which registers are read), and recording for each instruction its opcode; its operands (registers and immediate values); and whether or not the instruction is predicated (and thus not necessarily executed). For each register, track information on constant values formed by load constant and simple arithmetic instructions and whether the value was consumed by a subsequent instruction. Decode the DWARF .line section (which identifies which instructions correspond to which source files and line numbers) and tag each instruction within the BB with source file/line number information.

Step 3.1.3: For instructions which perform a control transfer and which are not the last instruction in the BB, update the current BB's end offset to the current instruction, and create a new BB from the current offset, invoking step 3.1 onwards for the new BB.

Step 3.1.4: For instructions which may perform a control transfer, create and add an EDGE to the EDGE list, using the opcode to determine the EDGE type. For ARM® v7 this includes: EDGE_DIRECT_FNENTRY (if the opcode is BL <imm>, or BLX <Rm> where the value "tracked" in Rm matches a symbol of type function), EDGE_INDIRECT_F-NENTRY (if the opcode is BLX <Rm>, and the value tracked in <Rm> does not match a function symbol), EDGE_ DIRECT_CONDITIONAL (if the opcode matches B{cond}<imm> where {cond} is not AL), EDGE_INDIRECT_CONDITIONAL (if the opcode matches BX{cond}, <Rm> where {cond} is not AL and the value tracked in <Rm> does not match a function symbol), EDGE_INDIRECT_SYSCALL (where opcode is SVC, BKPT) and destBB may/may not be setup, EDGE_LOOP (if the instruction is conditional and branches backwards in the current BB, or the opcode is CBN, CBNZ), EDGE_FALLTHRU (an additional EDGE created for all EDGE_*_CONDITIONAL to referencing the next BB). dstBB is calculated using the current offset and imm value for EDGE_DIRECT*. EDGE_INDIRECT_FNEXIT (an additional EDGE created for each FN referenced by EDGE_FNENTRY reversing srcBB and dstBB). dstBB references a special unknownBB for cases where it cannot be determined (e.g. some cases of EDGE_INDIRECT_FNENTRY). dstBB can be identified in an RTOS-specific manner using the register tracking information and knowledge of the RTOS ABI such as using the ARM® Linux EABI where SVC #0 instructions use the R7 register state to specify the operation, e.g. "MOV R7, <immValue>; SVC #0", when <immValue> is 1 dstBB is exit( ), when <immValue> is 4 dstBB is write( ).

Step 3.1.5: Iterate across the relocation section for the .data section(s) identifying references to BBs (by matching relocation entry's r_info value against a BB start offset), recording EDGE_INDIRECT_OR_COMPUTED for the matching BB.

Another novel feature of the software development tool is enhanced Dead Code Elimination (DCE) using specific knowledge of language specific runtime libraries. By tracking EDGEs to well-known language runtime features (such as the C language exit( ) function and the return path from the main( ) function) it is possible to determine whether related features of the runtime environment (such as invoking destructor functions, stack teardown and exit code reporting) could ever be called. If no EDGE to exit( ) or return path from main( ) is present, a significant number of well-known functions and data normally required by the C runtime library can be eliminated. As embedded systems do not terminate, it is often the case that by using this mechanism significant amounts of code and data which could never be executed can be removed. This optimization is not normally visible as the program itself does not contain direct calls to low-levels of the language startup (usually written in assembly language) or to the data structures used by initialization and termination features in language runtime libraries (which are normally implemented as lookup tables of constructor and destructor functions).

Step 4—Prevent Bogus Optimizations

Optimizations applied in the compiler tool use source-level information to limit certain optimizations (e.g. the C/C++ volatile qualifier indicates that related memory access may not be removed, merged with others, reordered, access size changed etc.). When optimizing compiler-generated assembly code such information is unavailable and thus optimizations may be performed which alter the semantics of the program.

The software development tool allows the safety of applying such optimizations to be determined automatically by consuming debugging information (e.g. the DWARF information held within the ELF file normally intended for use in debugging tools). DWARF uses a series of debugging information entries (DIEs) to define a low-level representation of a source program. Each debugging information entry consists of an identifying tag and a series of attributes.

Within a DW_TAG_compile_unit or DW_TAG_partial_unit occurrence of DW_AT_language which indicates assembly language source, or non-C/C++ source, or DW_TAG_producer being the assembler, disable certain optimizations within the relevant BBs. Using DW_AT_low_pc and DW_AT_high_pc allows detailed source information to be related to specific BBs. Any DIE using DW_AT_type attribute to refer to a DIE with DW_TAG_volatile_type indicates the C/C++ volatile qualifier, thus Dead Code Elimination and Memory Ordering optimizations should be disabled for those specific BBs. More sophisticated implementations may track volatile accesses per register and thus identify the individual load/store instructions which should not be optimized, or more simply they could be globally disabled for all load/stores within matching BBs.

The run-time performance of the re-sequencing linker (701) can be improved if the compiler (602) is modified to generate additional information which can be consumed more simply. Specifically an ELF flag for "contains volatile" could be generated and output on all functions which use volatile. This would avoid the need to consume the complex DWARF information. Additionally, even if the compiler options to generate DWARF were not used, the compiler can be modified to always generate the additional ELF information, or minimal DWARF information (e.g. just DW_TAG_COMPILE_UNIT with DW_TAG_volatile_types for functions using volatile). This would provide optimization-safety information even when the programmer has not specified that debug information should be generated.

Additionally, the software development tool allows optimizations to be disabled explicitly using the no-optimize file (704) which contains a list of file and function names (e.g. "bb_and_edges.c, wob"), which can also use wildcards (e.g. "* .c, rtosinternals*"). The developer's decision about no-optimization could be based on their own experience and/or information provided in the re-sequencing report (705).

Additionally by traversing the EDGE list, any occurrence of EDGE_INDIRECT_OR_COMPUTED should disable register spill/fill optimizations on a given BB and its descendants as the EDGE list is likely to be incomplete or inaccurate.

Step 5—Transform BBs Using Predication

Figure 6:
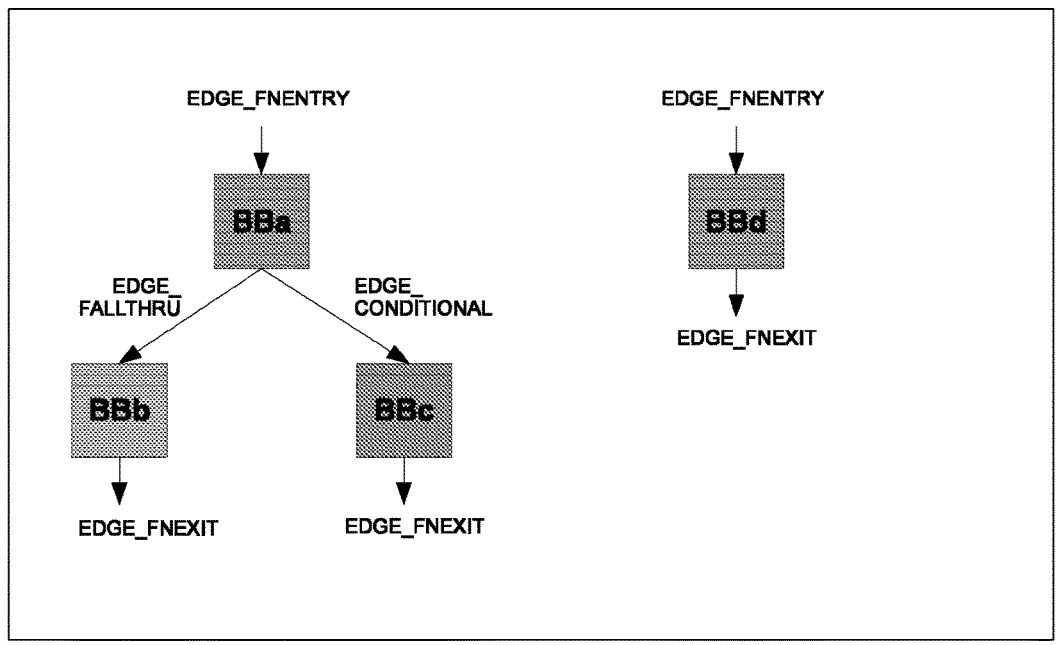
FIG. 6 illustrates basic blocks (BB) and edges for the branching functions of FIG. 5.

FIG. 5 shows a simple C language function whose behaviour is determined by the value of one of its arguments (the variable x held in register r0). Two example instruction sequences are shown, one using a branches and one using instruction predication (the ARM® V7-M IF THEN ELSE (IT) instruction, each instance of which allows up to 4 sequential instructions to be predicated to a specified condition or negative condition equivalent to the conditions available in branch instructions). FIG. 6 shows the BBs and EDGEs for these two approaches.

The branch version uses a conditional branch instruction (bpl.n) whose behaviour depends on the preceding compare against zero instruction (cmp). Well known algorithms (such as K. Pettis et al.) can be used to arrange basic blocks such that the most common control flow is "fall through" rather than taking branches, in order to minimize BCET through improved spatial locality and minimizing pipeline flushes caused by branches. This requires accurate prediction of which is the most likely EDGE, information which is difficult or impossible to accurately predict at code generation time. The predicated version uses an IF THEN ELSE instruction (it) such that the next two instructions (addlt and mulge) are executed conditionally depending on whether the comparison against zero instruction (cmp) set the less than (lt) or greater or equal (ge) flag.

FIG. 7 shows the BCET, WCET and ACET for the branch instruction sequences on two different types of processors (ARM® Cortex™ M3 and ARM® Cortex™ A15, both with differing pipeline depths, I-Buffer structures, and I-Miss penalties) for I-Hit and I-Miss cases. It can be seen that the differences between BCET and WCET are substantial, and therefore that the performance can be hugely improved by increasing the I-Hit/I-Miss ratio, and by ensuring the branch instruction "falls through" for the most common case. FIG. 8 similarly shows the results for the predicated version of the instruction sequence from FIG. 5. It can be seen that the branch penalty is eliminated, and due to the spatial locality achieved by sequential control flow that an I-Miss will not occur. Whilst the branch version exhibits marginally lower BCET, its WCET and ACET are up to an order of magnitude worse and the predicated version's BCET, WCET and ACET are comparable.

Existing compiler code generation technologies typically make poor use of predication techniques due to compiler's internal representations inaccurate target specific costs (such as the actual number of machine instructions in each basic block), and lack of device-specific knowledge of the I-Buffer and branch mechanism's behaviours.

The software generation tool uses BB and EDGE information to transform branch based instruction sequences to optimize I-Hit behaviour, reducing static and dynamic branches, and ideally using predication mechanisms to realize significant reductions in WCET and ACET, and potentially in BCET (through a reduced "pollution" of I-Buffer state caused by unpredictable dynamic branches). The resulting "super BB" also provides enhanced opportunities for intra-BB optimizations.

Given the BB and EDGE information generated, it is possible to transform and merge certain BBs, eliminating EDGEs and removing branch instructions. This allows a simple conditional branch instruction to be replaced with appropriate IT instruction in many situations, some examples of which are shown below in Tables 1 and 2.

TABLE 1

Simple "if (cond) { ... }" transformation

| Block | Construct | Requirements | Transformed by |
|---|---|---|---|
| BBa | if (cond) { | BBa has EDGE_DIRECT_CONDITIONAL to BBb | Replace last instruction (conditional branch) in BBa with IT cond |
| BBb | ... | BBa has EDGE_DIRECT_FALLTHRU to BBc | |
| | } | BBb has EDGE_DIRECT_FALLTHRU to BBc | Append BBb and BBc onto the end of BBa (merging all EDGEs except those to/from BBb and BBc) |
| BBc | | BBb.numInstrs <= 4 | |
| | | BBb meet ITT restrictions (no IT, CB* instructions etc.) | Delete BBb and all EDGEs to/from it |

TABLE 2

Simple "if (cond) { ... } else { ... }" transformation

| Block | Construct | Requirements | Transformed by |
|---|---|---|---|
| BBa | if (cond) { | BBa has EDGE_DIRECT_CONDITIONAL to BBb | Replace last instruction (conditional branch) in BBa with IT cond |
| BBb | ... | BBa has EDGE_DIRECT_FALLTHRU to BBc | |
| | } else { | (BBa.numInstrs + BBb.numInstrs) <= 4 | Append BBb and BBc onto the end of BBa, onto the followed by merge (merging all EDGEs except those to/from BBb, BBc) |
| BBc | ... | BBb and BBc meet ITT restrictions (no IT, CB* instructions etc.) | |
| | } | | Delete BBb and all EDGEs to/from it |

Furthermore, the above transformations can also be applied to BB with >=4 instructions by repeating the IT instructions for each sequence of up to 4 instructions. This will increase the codesize slightly compared to the branch version, and reduce the BCET slightly (as each non-executed instruction still takes 1 cycle) but the stated benefits on I-Fetch spatial locality, I-Buffer behaviour, I-Hit/Miss ratio, WCET, ACET and determinism still apply. By using relevant device-specific information related to the memory system, branch costs, and interactions between sub-parts of the whole program when generating the whole program, the most optimal instruction sequences can be generated even if they potentially contain a small number of additional IT instructions (as the extra "wasted" IT cycles are hidden by reduced frequency and cost of I-Miss operations).

Furthermore, the software development tool need not be specific to the ARM® IT instruction. It could also be applied to other conditional instructions (such as MIPS® MOVZ conditional move instruction whereby a conditional branch instruction over BBx containing a non-conditional move can be transformed by removing the branch instruction, replacing it with a conditional version of BB'x move instruction and deleting BBx. Furthermore, on targets without prediction or conditional move, a multiply instruction can be used to achieve the same effect by ensuring one of the terms is the condition 0 or 1 (i.e. x*0=0, x*1=x).

Following application of this step, the number of BBs and EDGE is potentially lesser, further simplifying the application of subsequent optimizations. The size of BBs is potentially larger, increasing the scope for intra-BB optimizations.

Step 6—Identify Data and BB Relationships

This method step results in a full list of DATA items with each BB recording which DATA items it accesses. The details of the automatic method steps performed in Step 6 are as follows:

Step 6.1: Iterate across the data sections (typically being .bss, .data, .rodata, .strtab) adding entries to the DATA list for each distinct address range.

Step 6.2: Iterate across the relocation section for the .text section, identify references between BB and DATA, and record the reference in each BB. The presence of load and of store operations for each DATA item should also be recorded using the BB's instructions disassembly and tracking the register into which the DATA reference was made, and whether subsequent instructions performed load, and/or store instructions to it.

Step 7—Perform Intra-BB and BB/Data Optimizations

Each block is independent and so the intra-BB operations described herein can be invoked on multiple BBs in parallel threads of execution enabling the re-sequencing optimizer to perform its operation using less machine resources and operating in a timely manner, thus making wide application of optimizations practical.

A number of optional automated optimizations are applied, some of which are described below. Other optimizations may also be applied.

Step 7.1—Function Specialization/Data Alignment

References between BBs and DATA can reveal properties such as size and alignment of DATA which were not available at compilation time (e.g. if the DATA item was located in a different compilation unit).

DATA size and alignment limits the application of optimizations such as function specialization—replacing the body of a function with a version optimized for a given set of input values. For example, common implementations of the standard C language memcpy( ) routine includes a series of conditional instructions to select a specific loop optimized for copying multiples of 1, 2, 4 or 8 bytes. If the arguments passed into memcpy( ) can be statically determined when generating the program, a static call to a specialized 1, 2, 4 or 8 byte version can be used instead, eliminating the need for the conditional instructions (reducing the program size and increasing its performance as less instructions are executed). For example, given the code in FIG. 5, calls to the function StrangeMath where the value of variable x (the 1st argument) is known at the point of code generation could be replaced by either of the instructions at line 2 or line 4, eliminating the need for the conditional instructions at line 1, eliminating the function call, the conditional instructions at line 1 and the overhead of the function call (and the related disturbance to instruction fetch caused by the function call overhead, and I-Miss due to poor spatial locality between the function StrangeMath and its caller).

By analysing the called function's BBs and matching against known input values passed in registers as part of the function call sequence, a highly optimized version of the function can be inlined into the calling BB improving I-Hit (through an increase in spatial locality), improving performance (by the removal of function call/return and subsequent pipeline effects), and improving determinism. In many circumstances an inlined version of a simple function (such as memset) may also be smaller than the function call sequence, further improving performance through reduced I-Buffer pollution.

Additionally, by matching the called function's name it is possible to identify calls to well known functions (such as memset, memcpy, memmove, strcpy etc.) and replace them with calls to highly-machine optimized equivalents (e.g. which use DMA engine rather than instruction execution).

References to known DATA items should also tag said items with information specific to the desired alignment by tracking instruction sequences which reference the DATA item (e.g. MOV of a DATA item's address) and subsequent arithmetic operations to isolate the low-order bits followed by branch instructions. Such sequences denote alignment-specific branches, and it is reasonable to assume that larger alignment (e.g. 4 byte rather than 1 byte) will provide more efficient execution). By tagging DATA items with such alignment specific information they can be aligned in a manner which will enable the use of the most efficient sequence.

Step 7.2—Simple Peephole and Strength Reduction

The compiler's view of a BB uses target-generic intermediate forms, whereas the re-sequencer sees target-specific instructions, providing further opportunities for applying classic peephole optimizations. Real machine costs rather than simple cost models allow the best instruction choices to be made automatically (e.g. a sequence of shift, add instructions may theoretically be faster than a multiply instruction, but the multiply instruction causes less I-Buffer pollution and thus is likely to be faster overall, and an ARM® v7 32-bit multiply instruction may be faster than the 16-bit multiply instruction based on code layout and use of condition flags).

Due to the small size of the BBs, and the transformation of branching between multiple BBs into predicated execution it is also beneficial to apply well-known super-optimization algorithms at this point. As this step is executed in parallel it allows a significant number of super-optimization tests to be performed.

Step 7.3—Optimize Constant Formation

Processors typically provide instructions to form small constants (for example ARM® V7-M 16-bit MOVI instruction which forms 8-bit constants). Forming larger constants can require larger or multiple instructions (for example the ARM® V7-M 32-bit MOVW instruction which forms 16-bit constants). A more program size efficient approach places the constant values directly in the instruction memory and uses PC-relative load instructions (for example the ARM® v7 LDR [pc, #offset] instruction). This approach can result in smaller programs at the expense of increased I-Miss (due to the constant values polluting the I-Buffer with non-instructions) and increased D-Miss (due to instructions polluting the D-Buffer with non-constant values). FIG. 9 shows the difference between these approaches in terms of program size, BCET and WCET for a contrived example. It can be seen that existing approaches typically damage ACET/WCET for a theoretical decrease in BCET and program size.

If program size is paramount and PC-relative loads are used, the constants should be placed in a target-specific position relative to the BB. Existing methods place such constants at the end of each BB block or function, but target-specific I-Buffer prefetching and alignment issues may result in them being read into the I-Buffer. By considering target-specific I-Port and prefetch, constants can be grouped and aligned relative to the start of BBs to limit I-Buffer pollution to ensure they are not prefetched.

If ACET is paramount, PC-relative load instructions and corresponding constant data should be transformed into MOV instructions to form directly the constant.

Step 7.4—Address Mode Usage

Processors typically provide addressing modes which combine load/store using a base register address with pre/post register modification, saving instruction cycles and I-Buffer space. Generation of such instructions is often sub-optimal in compiled code due to the compiler's intermediate BB representations being more abstract than the target instruction set view, perturbations in compiler analysis being caused by instruction scheduling and not being able to determine opportunities for such instructions across multiple BBs.

The software development tool provides scope to further optimize use of such address modes by analysing each BBs load/store instructions and pre/post instructions which modify the base address register with simple add/subtract operations and replacing the load/store instruction with the pre/post modified version. Furthermore, merging of BBs provided by this inventions transformation of branches into merged BBs provides greater scope to apply such transformations.

Step 7.5—Insert Device-Specific I-Buffer/D-Buffer Control Code-Generation

Most targets' I-Buffers have limited capacity e.g. the STM32 device's I-Buffer (known as the ART Accelerator) consists of a multi-way cache structure with very limited resources. The FLASH_ACR register provides a .ICEN bit to enable/disable the cache, a .PRTFEN bit to enable/disable prefetching.

BB control flows with highly unpredictable behaviour or poor spatial locality could completely overwrite the contents of the I-Buffer destroying information which would accelerate execution of other BB control flows. Thus if it can be determined that a given set of BBs are infrequently executed, each BB is smaller than each I-Buffer stride, and the BBs have unpredictable control flow it may be advantageous to insert additional instructions at the start of the relevant control flow to disable specific I-Buffer mechanisms, and to re-enable them at the end of the sequence. This will benefit ACET in real-world situations.

Furthermore, for targets with high memory latency, it may be worthwhile inserting additional instructions to prefetch I-Fetch/D-Fetch addresses for the BBs with the greatest difference between their BCET and WCET.

Step 7.6—Dead Code Elimination

This optimization should not be performed if the BB was marked as containing volatile memory accesses. Standard algorithms should be re-applied to remove instructions which are redundant (i.e. calculate a result or perform a register write, whereby said register is subsequently overwritten without being read by another instruction in the same BB). Such instruction sequences can occur in compiled code (e.g. mov r15, r6; mov r6, r15). Additionally, BBs which are not referenced by any other BBs, or DATA items should be deleted.

Step 7.7—Instruction Scheduling

This optimization should not be performed if the BB was marked as containing volatile memory accesses.

Instruction scheduling optimizations should be applied, within the constraints of existing register allocation, and availability to potentially reorder instructions within the BB to ensure high-latency instructions (such as loads or multiplies) are scheduled as early as possible. Unlike compiler-based scheduling, as the register allocation has already occurred, and provided it is honoured, no additional register pressure issues will occur, thus this step can only improve efficiency.

Step 8—Generate Per-BB Cost Information

This step requires target-processor specific information to disassemble the instructions and their operands. Information is generated to rank the effects of executing BB on the underlying processor and memory system, in terms of processor cycles and energy behaviours.

Each block is independent and so these steps can be invoked on multiple blocks in parallel threads of execution, enabling the re-sequencing optimizer to perform its operation using less machine resources and operating in a timely manner, thus making wide application of optimizations practical.

D-Buffer effects are recorded for the BB to represent the worse-case access seen in ascending order of: DBUFFER_NOACCESS=0, DBUFFER_HIGHLY_SEQUENTIAL=1 (if load/store instruction use register and immediate addressing modes), DBUFFER_POTENTIALLY_NONSEQUENTIAL=2 (if load/store use a register as the address where that register has been used as the destination in a load instruction in this BB), DBUFFER_DEFINATELY_NONSEQUENTIAL (if load/store uses register+register addressing modes and non-constant values where formed in at least one of the registers).

Energy is recorded for the BB to represent a normalized summation of energy required to execute the instructions formed using a target-specific instruction cost model e.g. nop instructions=1, multiply instructions=3, load instructions=20). BCET is recorded for the BB by summating each instruction's BCET values from a lookup table. Similarly I-WCET is recorded for the worse case due to I-Fetch effects (i.e. potential for branch mispredict causing pipeline flush and I-Miss etc.). Similarly D-WCET is recorded for worse case due to D-Port effects (potential for D-Miss etc.). Separating I-WCET and D-WCET allow subsequent optimizations to apply code layout optimizations, giving preference to BBs which are not D-Port bound.

The following are the finer details of the automated actions performed under Step 8:

Step 8.1: Iterate across each BB initializing its properties: instr sequence flow (a bitmap defining whether the instruction is executed sequential, defaulting to true), D-Buffer effect to DBUFFER_NOACCESS, energy to 0.

Step 8.1.1 Iterate across all the instructions within a given BB updating instr sequence flow, D-Buffer effect, energy, BCET, I-WCET and D-WCET according to the disassembled instructions for that BB. If the current instruction is a load or store, and if current D-Buffer effect is >=DBUFFER_POTENTIALLY_NONSEQUENTIAL the D-WCET value for the current instruction should be multiplied by a target-specific constant DBUFFER_CPU_CLK_RATIO (denoting the device-specific clock ratio between the processor and its D-Buffer).

Step 9—Perform Inter-BB Optimizations

According to the processor's Application Binary Interface (ABI) registers defined as callee-save, which are used in the body of a function, must be saved on the stack as part of the function's entry BB, and restored from the stack as part of its exit BB(s). The ARM™ EABI specifies R4 through R8 are callee-save. Consider that in FIG. 3 functionC uses R4 and R6, thus its entry BB must save R4 and R6 on the stack, and its exit BB(s) must restore R4 and R6 from the stack. If the BB in functionB returned to from functionC writes R4/R6 without reading them, the save/restore of R4/R6 within functionC was unnecessary.

Removing unnecessary save/restore sequences can remove instructions (saving I-Buffer operations and increasing I-Hit), save instruction and memory cycles, and lessen the stack usage (increasing D-Hit) and thus improve all of codesize, performance and energy.

The software development tool can optimize such sequences with entire program scope as follows: For each BB reached by EDGE_FN_ENTRY which is not reached by EDGE_INDIRECT, use the disassembly to record the set of callee-save registers. Correlate with the corresponding BBs returned to by EDGE_FN_EXIT and use the disassembly to determine which callee-save registers are written before they are read. Combine the callee-save information across all these BBs to identify the true set of callee-save registers. Modify/remove the instructions in the entry BB and exit BBs appropriately.

Step 10—Calculate FN/BB Ordering

Device-specific I-Buffer, D-Buffer and memory properties vary considerably between different chip/system designs and strongly influence performance. For example, if the on-chip memory (109) comprises NOR flash memory, it is typically 64 or 128-bits wide, and thus provides spatial locality for up to 4 or 8 adjacent 16-bit instructions. For example, if the off-chip memory (112) comprises a Micron M25P10-A serial NOR flash devices it provides 1 MBytes of storage, arranged as 4 sectors of 32768 bytes, each sector comprising 512 pages of 256 bytes. Accessing an arbitrary 24-bit address requires 32-bits of serial command data to be transferred to the device, accessing the next ascending address requires no additional commands and thus is 32 times faster than accessing a random address. Thus spatial locality is provided for adjacent instructions. For example, if the off-chip memory (112) comprises a 64 MByte DDR DRAM device formed from 4 independent 16 MByte memory banks, each arranged as 1024 columns of 8192 byte rows. Accessing a random address involves a transaction to "open" a row (requiring a number of cycles known as row-to-column delay), followed by a read operation using a column address and requiring multiple cycles to read the data. Accessing other addresses within an already open same row avoids the row-to-column cycles, whereas accessing addresses in a different row requires another command and multiple cycles to close the row, followed by additional cycles to open the new row. Multiple memory banks can be "opened" at once, so arranging memory accesses to avoid conflicts in the same bank and row can increase improve performance considerably by benefiting from spatial locality within rows and within separate memory banks. Burst mode accesses, whereby all the rows in a given column are accesses sequentially can also improve performance, especially when used for I-Buffer/D-Buffer fill and fill operations.

Executing from RAM rather than NOR can provide significant power advantages (due to increase performance and efficiency the program can complete its work and return to the idle state more quickly). However, on-chip RAM systems are typically much smaller than on-chip NOR, often too small to be used in this manner. The software development tool can offer many of the advantages from executing from RAM when executing from NOR, saving energy and enabling use of lower-specification hardware components.

Unlike existing compiler optimizations, the software development tool considers device-specific I-Buffer (104) properties (such as numOfStrides, sizeOfStride, Critical Word First, and multi-banked properties) and system-specific memory controller (110) and memory devices (109, 112) when determining the optimal FN and BB layout in order to maximise spatial locality and minimise time spent on I-Miss/D-Miss operations.

With reference to FIG. 3, in order to maximize I-Hit ratio and reduce time (and energy) taken to fetch instructions, and if the I-Buffer is suitably sized to contain the majority of functionA, functionB, functionC and functionD's instructions, and thus avoid "thrashing" whereby sub-sequences of the instructions would occupy the same locations in the I-Buffer (104) and thus require continual re-fetching from the underlying memory (109, 112), spatial locality can be enhanced by arranging functions with the following localities relative to the target's I-Buffer capabilities: {functionB, functionC}, {functionA, functionD, {functionA, functionB}, {functionA, functionB, functionD}

However, if the I-Buffer is too small to hold all of single function's instructions, or too small to hold the instructions from all of the functions simultaneously, it is more advantageous to recognize that I-Hit will only occur for instructions arranged in a linear sequence, that I-Miss is unavoidable and will be frequent for non-linear sequences (such as branches or function calls), and to arrange the functions in memory to minimize the time taken for I-Miss operations (e.g. use specific alignments for burst-mode accesses etc.).

Furthermore, in systems supporting NUMA memory, the ideal placement of instruction sequences in memory depends on the spatial and temporal effects when fetching instructions. By ensuring the layout of instructions in memory is sympathetic to these factors, the performance of instruction fetch and thus the performance of the overall processor system and its energy consumption can be improved. For example, consider a system with a small on-chip memory (109) can be accessed more quickly than off-chip memory (112), but which is too small to hold all the functions. In this case it would likely be optimal to place functionC and functionB into the faster on-chip memory (109), and the less frequently accessed functionA and functionD into the slower off-chip memory. The software development tool includes automatically placing known RTOS-specific interrupt handling routines into the fastest NUMA areas to minimize common RTOS operations included context switching.

Figure 15:
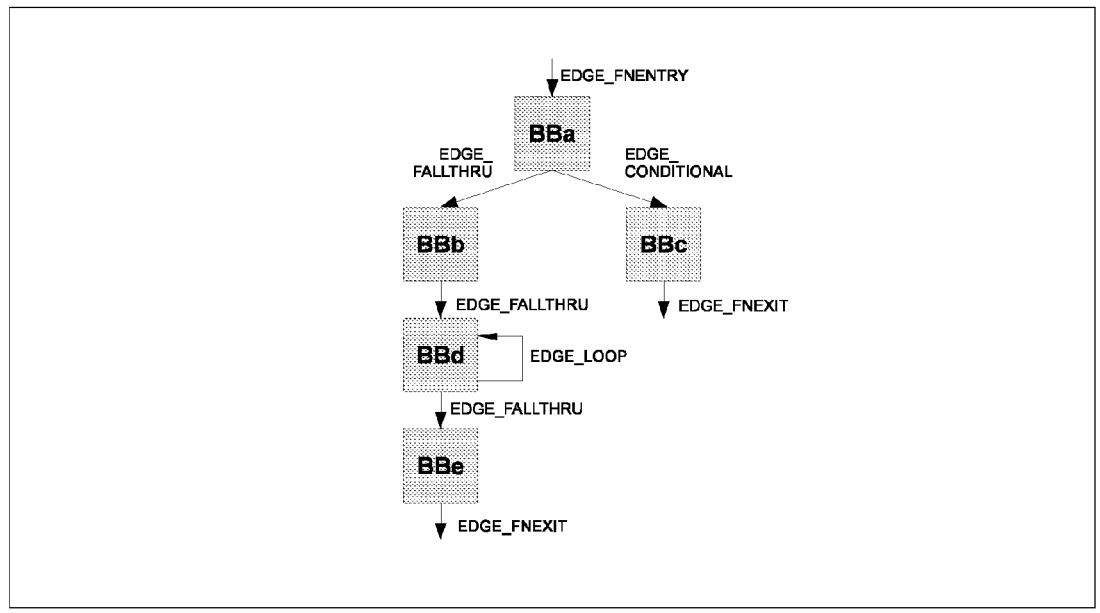
FIG. 15 illustrates a basic block structure within function.
Figure 16:
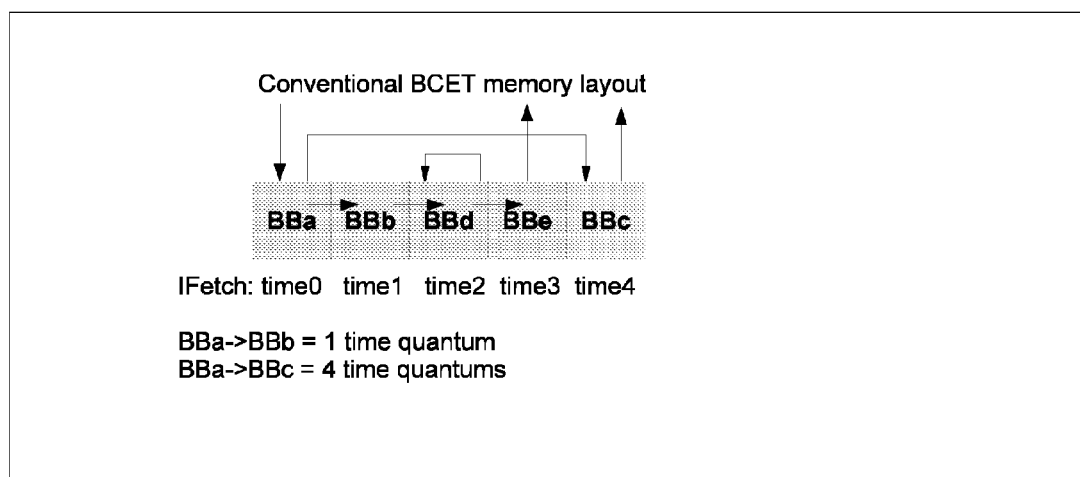
FIG. 16 illustrates a conventional BCET BB memory layout.
Figure 17:
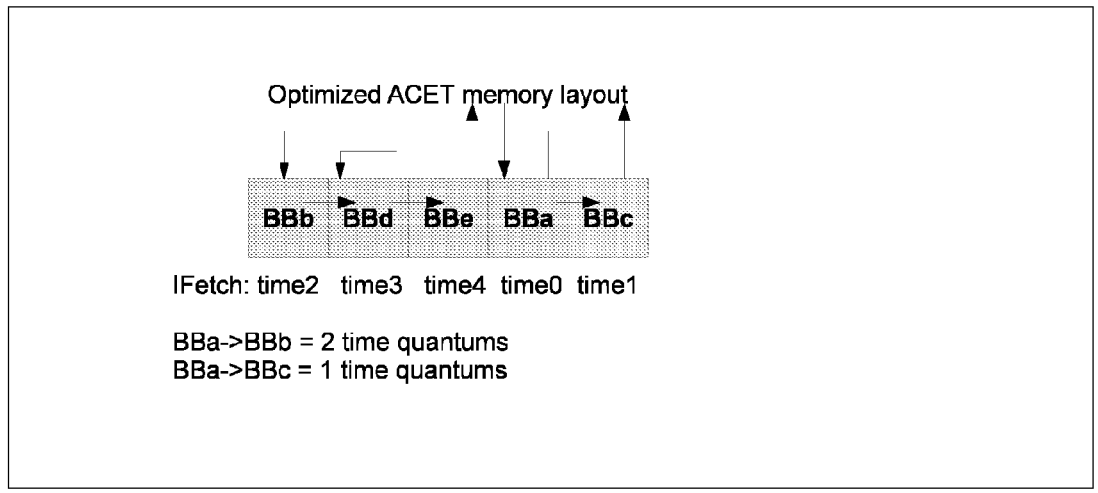
FIG. 17 illustrates the re-sequenced ACET BB memory layout in accordance with the present invention.

The BB flow in a simple function is shown in FIG. 15. BBa is the function entry and performs a conditional branch based on an input argument (if NULL then executing BBc which returns to the caller, if not NULL then executing BBb which is a loop header, loops within BBd, exits the loop into BBe which returns to the caller. FIG. 16 shows this sequence which is optimal for BCET in the predicted common case. The time quantums for linear fetches are shown in terms of I-Fetch timings (where 1 time quantum is typically 10 . . . 100 CPU cycles). FIG. 17 shows an alternative layout, optimized for ACET which is novel in that the first BB in the memory layout is not the entry point, and the arrangement is optimized for the I-Buffer's critical word first behaviour, whereby BBa and BBc are placed such that BBc is at the end of a cache line. On entering the function at BBa, if an I-Miss occurs the instructions in BBa will be fetched first, irrespective whether they were at the start of a cache line, and the I-Fetch will continue in linear modulo order. Compared to FIG. 16, the I-Fetch timing is marginally worse for the predicted common case (though the extra I-Fetch time is likely to be hidden by the pipeline flush caused in the branch from BBa→BBb, though if the branch predictor is "warm" this penalty may not occur). I-Fetch timing significantly better for the predicted uncommon case of BBa→BBc. In real-world scenarios this arrangement will produce uniformly better performance for a given execution, and leaves the I-Buffer state "hot" for both BBa→BBb and BBa→BBc cases.

It can be seen that improving I-Hit/I-Miss ratio and reducing the time taken for I-Miss is heavily dependant on the layout of instructions in memory relative to the hardware mechanisms used in the CPU (101), the I-Buffer (104), the on-chip memory (109), the memory controller (110) and the off-chip memory interconnect (111) and off-chip memory (112). The software development tool considers, in an automated manner, the device's I-Fetch mechanisms and the costs rather than frequencies of BBs in order to determine an appropriate order. Furthermore it considers WCET in addition to BCET.

Layout can be determined as follows. Firstly to determine automatically the order of FNs in memory:

Step 10.1: Process the list of EDGEs created previously to isolate the FN_ENTRY edges and count the number of times each FN is invoked (known as the edgeCount) by summating related FN_ENTRY_EDGEs from all BBs. Sort this list firstly by edgeCount and secondly by the difference between the FNs I-WCET and BCET. This is known as the fnOrder list.

Step 10.2: Consider fnOrder list and the list of memory areas (with the fastest first) to determine an overall placement of FNs in memory areas such that all FNs in the fnOrder list will be placed in a memory area, having used all available space in the fastest memory area before moving onto the next memory area.

Step 10.2.1: Firstly allocate known common FNs and all their BBs (including RTOS specific functions which don't necessarily have EDGEs specified) to the fastest memory area. Similarly allocate FNs named in the hot function file (702).

Step 10.2.2: Iterate over all the FNs, processing all the BBs in each FN. If a BB is reached by an EDGE_LOOP multiply its energy, BCET, I-WCET and D-WCET appropriately. Generate a total FN cost by summating BCET, I-WCET, D-WCET and energy for each BB in the FN.

Step 10.2.3 Iterate over the fnOrder list and allocate a FN (known as FNx) and all its BBs in the next available fast memory location. If the I-Buffer, I-Port, memory controller and memory device have specific performance related properties (e.g. burst-mode alignments) consider this and ensure the FN is aligned for best performance.

Step 10.2.4: Process the FNx's EDGE list checking for EDGE_*_FNENTRY to identify the most common FNs it may invoke and allocate them to appear sequentially as close to FNx as possible (given properties of the I-Buffer such as number of strides, size of strides etc.). This may include placing FNx in "padding" areas between alignments determined in Step 10.2. The number of common FNs selected in this manner is determined by the byte size of FNx relative to the I-Buffer's capability (typically to not exceed more than 1 or 2 I-Buffer strides for simple I-Buffers, potentially up to 10 I-Buffer strides for FNs in the top 30% of the fnOrder list.

Step 10.2.5: Repeat Step 10.2.3 through 10.2.4 until all FNs have been processed. We now have an ordering and alignment for each FN in each memory area.

Secondly, to determine the order of BBs within each FN:

Step 10.5: Iterate over the FNs considering their BBs from the entry point onwards.

Step 10.5.1: If any of the FN's BB is marked as containing volatile memory accesses or if the FN is named in the non-optimize file (704) or has a do not apply the re-sequencing operations below.

Step 10.5.2 if a BB has an edge(fall) EDGE_FALLTHRU to BBfall, and edge(cond) EDGE_CONDITIONAL to BBcond potentially alter the control flow between BB/BBfall and BBcond by modifying the last instruction in BB to reverse the condition and swapping edge(BBfall) and edge (BBcond). The criteria for determining whether to apply this re-sequencing are target-specific and may involve factors such as:

Step 10.5.2.a: Summating BCET for all the blocks following BB(fall), and similarly for BB(edge). Re-sequence if summated BCET for BBfall is >summated BCET for BBcond.

Step 10.5.2.b: Summating I-WCET for all the blocks following BB(fall), and similarly for BB(edge). Re-sequence if summated I-WCET for BBfall is <summated I-WCET for BBcond Step 10.5.2.c: Summating D-WCET for all the blocks following BB(fall), and similarly for BB(edge). Re-sequence if summated D-WCET for BBfall is <summated D-WCET for BBcond.

Step 10.5.2.d: Summated the byte size of BB(fall) and its descendant BBs, similarly for BB(cond). Re-sequence if summated byte size BBfall is >summated byte size BBcond.

Step 10.5.3: Repeat steps 10.5.2* until all FNs have been processed.

Step 11—Calculate Data Ordering

To determine the optimal ordering of global DATA requires knowledge of the system's D-Buffer (105), memory controller (110) and off-chip memory (112). For example consider a system with a trivially small D-Buffer (e.g. 128 bits) using the earlier example of a 64 MByte DDR DRAM device formed from 4 independent 16 MByte memory banks, each arranged as 1024 columns of 8192 byte rows, where there is a time penalty to access distinct rows, but up to 4 banks can be open at once and distinct banks can be accessed without penalty. An instruction sequence which accessed two distinct instances of exampleStruct would gain higher access efficiency if the two instances of exampleStruct were separated in memory addresses such that they were located in separate banks (as there is no bank to bank access time penalty). Conversely for a machine with a D-Buffer large enough to reasonably accommodate exampleStruct, placing the two instances of exampleStruct adjacent in memory to benefit from D-Buffer spatial locality would provide a benefit.

The optimal layout of data items in memory is highly dependant on the pattern of accesses caused by the instruction sequences instruction sequences which access them, the properties of the interfaces used to access the memory (103, 105, 109, 110, 111, 112) and their interaction with the layout of other data accesses within memory devices (109, 112), e.g. for systems with separate memory banks (e.g. DDR DRAM) ensure DATA and BBs which are connected are placed in separate memory banks.

By ensuring the pattern of read/write data accesses in memory is sympathetic to these factors, the performance of read/write data accesses and thus the performance of the overall processor system and its energy consumption can be improved. The following is an example of an automated technique for optimizing the performance of read/write data access:

Step 11.1 Using the fnOrder list from Step 10 and the BB→DATA reference list from Step 6 iterate over those lists to produce a count of references to each DATA item which only have load operations identified, this is identified as the dataLoadOnlyReference list. Sort this list by the number of references made to each DATA item. Create a second list, recording those DATA items not in dataLoadOnlyReference list, this is identified as the dataLoadStoreReference list, and sort this by the number of references made to each DATA item.

Step 11.2: Perform the steps listed below for both the dataLoadOnlyReference list and the dataLoadStoreReference list (referred generally below as dataReference list) in turn to ensure that items from each list are placed separately.

Step 11.3: Consider the dataReference list, and consider the type of the DATA (BSS, ReadOnly etc.), and consider the list of data memory areas with the fastest memory area first) to determine an overall placement of DATA in memory areas such that all DATA in the dataReference list will be placed in a memory area, having used all available space in the fastest memory area before moving onto the next memory area.

Step 11.4 Iterate over fnList (with the current FN referred to as FNx) and iterate over the dataReference list and allocate DATA (known as DATAx) in the next available fast memory location. Use DATAx's alignment constraints (from Step 7.1) to generate the maximum necessary alignment (reduce and preferably minimize occurrences of D-Miss), and if the D-Buffer, D-Port, memory controller and memory device have specific performance related properties (e.g. burst-mode alignments) consider this and ensure DATAx is aligned for best performance.

Step 11.5: Process FNx's BBs to determine which other DATA is referenced and allocate those DATA to appear sequentially as close to DATAx as possible (given properties of the D-Buffer such as number of strides, size of strides etc.). This may include placing DATAx in "padding" areas between alignments determined in Step 10.3.

Step 11.6: Repeat Steps 11.4 through 11.5 until all DATA has been processed. We now have an ordering and alignment for each FN in each memory area.

Step 12—Resolve Symbols to Addresses and Re-Optimize BB Instruction Sequences

Most processors provide multiple types of each instruction (e.g. branch immediate, constant forming) which vary according to the numeric range of the immediate operand. For example, branch immediate with a 4 bit range, and branch immediate with a 16-bit range (the latter instruction is larger than the former). Compilers typically use an abstract model of number of instructions rather than actual PC addresses and so are unable to select the optimal instruction. At link-time the actual addresses are available, and so it is possible to modify instruction sequences to use the most optimal forms.

As the symbols are resolved to addresses this should be considered and thus if the relocation type for a given symbol is part of a constant forming or address offset instruction, those instructions within the BB should be replaced with shorter instruction sequences if the resolved symbol value permits this.

Step 13—Generate Feedback for Re-Compilation

Figure 19:
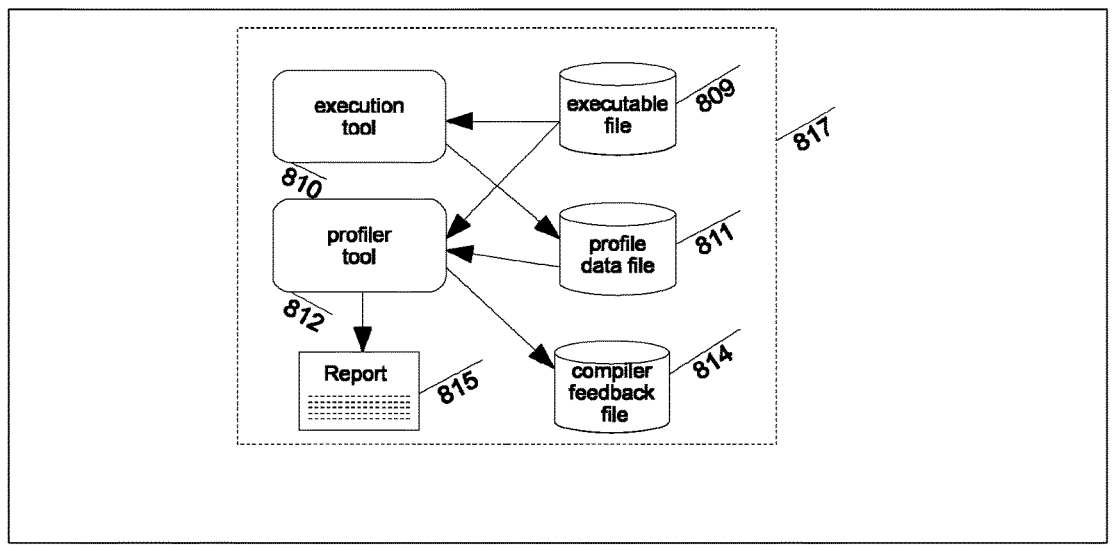
FIG. 19 illustrates a conventional execution and profiling tool flow.

Conventional compiler feedback files to control branch probabilities and BB ordering are generated by a profiler (FIG. 19). The software development tool can generate them statically within the re-sequencing linker (FIG. 20). As it is not necessary to dynamically execute the program this method is possible in all circumstances, irrespective of the limitations of the target system and its ability to execute profiler tools, and does not require the user to attempt to stimulate typical behaviour during the profiler's training run. Conventionally, when existing compilers are not provided with dynamic feedback files they generate this information statically for each compilation operation using algorithms such as those described by Pettis & Hanson in "Profile Guided Code Positioning" (Proceedings of ACM SIGPLAN 90 Conference). The software development tool generates feedback over the scope of the entire program, using more accurate information on the relative priorities of BBs and EDGEs over those seen when statically generating this information one file at a time, as illustrated in the following automated task.

Step 13.1 Use the BB and EDGE information generated in Steps 3 and 4 to generate a feedback file in the normal form used by the compiler (e.g. GCC's .gcda files) to describe the estimated frequency of calls to each BB and the EDGE frequencies. When the program is recompiled, these files will be consumed and used to generate second object files (606) containing a more highly optimized version of the source (601).

A new type of feedback file can also be generated which will be consumed by the compiler and used to generate the fields in data structures in a different order to those expressed in the source files. By reordering a higher D-Hit rate can potentially be achieved which will reduce D-Port traffic, increasing performance and lowering energy consumption. As the alignment of data structure fields (other than those used exclusively in global DATA) cannot be controlled or assumed due to dynamic stack or heap placement, the reordering is chosen on the basis of temporal locality not spatial locality. The software development tool uses debug information from the object and library files with the BB and EDGE information to examine the source information, and determine the idea ordering based on accesses made to it, as illustrated in the following automated tasks:

Step 13.2 Firstly the safely of the reordering is confirmed by checking the DWARF debug information for the type of input arguments to all FNs:

Step 13.2.1 Process all objects and libraries DWARF information to build a list of data structures defined by DW_TAG_constant, DW_TAG_variable using their DW_AT_type to identify the structure type.

Step 13.2.2 Collate all DW_TAG_subprogram entries (which define functions) and the DW_TAG_formal_parameter entries which describe the input arguments against the total list of FNs. If a FN exists for which a DW_TAG_subprogram entry does not exist the definition of the function is not present in the source code provided to the compilation and thus the structure must be marked as not being reordered.

Step 13.3 For the set of structure definitions which are marked as can be reordered generate a field reordering:

Step 13.3.1 Process all BBs and use the DWARF DIE information to track the type of variables against FN arguments and local variables (by observing DW_TAG_variable entries whose DW_AT_type match a structure to be reordered). The DWARF information identifies which register each variable is held in, and by inspecting disassembled instructions in each BB and the immediate offset using with load/store instructions the field within a structure can be identified against the type definition's field offset (i.e. offset 0 is the first field, offset 4 is the 2nd field where the first field is a 32-bit value etc.).

Step 13.3.2 For each field referenced, record a count of the number of load/store operations to into a value known as fieldHit. In BBs which are reached by EDGE_LOOP multiply fieldHit by the loop limit (where known) or by 3 if unknown. Summate the count across all BBs. We now have a count of how often each field in each structure is accessed.

Step 13.4 Generate a reordering for each structure by sorting fields by their numerically ascending fieldHit values (i.e. the most accessed field appears at the start) and outputting the fields in a first pass which considers the fields in fieldHit order whose size is less than ¼ of the D-Buffer stride size, and in a second pass of the remaining fields in fieldHit order.

The compiler should be modified to read the feedback file, and to generate an alternative field ordering where seen.

Step 14—Generate Report

A human-readable report on the optimizations is produced, together with details of FNs and DATA items which could not be optimized, such that the programmer may modify the source code to allow further automatic optimizations to be applied following a second compilation and linking operation.

The report identifies the FNs that were not optimized (as defined in Step 4). This may allow the programmer to modify the source-code such that the volatile memory accesses are performed in a separate function, allowing the rest of the function to be optimized.

The report also contains information on the specific optimizations performed by Steps 5, 6, 7, 9, and 10. The cost information generated in Step 8 may also be shown, enabling the programmer to use the hot file (702) and cold file (703) to further control optimizations. The data structure field reordering output (Step 13) is also shown in a human readable form.

Step 15—Re-Generate Debug Information and Output the Executable File

The software development tool provides a mechanism to ensure debug information contained in the original object and library files is accurate in the presence of re-sequencing optimizations. As the software development tool operates on object and library files containing full relocation information, it is possible to use this to implicitly generate debug information in the normal manner. The DWARF Debug Information Entries (DIES) in the object/library files uses symbols and so will cope with BBs and DATA whose order/address are likely to be changed by Step 10.

Other aspects of the debug information require modification to match the optimizations applied. In Step 9 the ABI defined registers which are saved on the stack as part of a FN_ENTRY sequence and restored as part of a FN_EXIT sequence are potentially modified. In Step 3 the DWARF .line section (which identifies which instructions correspond to which source files and line numbers) was expanded and each BB's instructions tagged with source file/line number information. Subsequent automated optimizations in the steps previously described will have updated each modified instruction's source tags, as outlined below. Instructions which were removed implicitly have no source tags, instructions which were reordered will still have correct source tags, instructions which were replaced should have cloned the original instruction's source tags.

Step 15.1: Regenerate the DWARF information by iterating over all FNs processing all BBs within each function.

Step 15.1.1 Discard the original .line section and replace with a newly generated version created using each instruction's source tags to describe the mapping between instructions in a FN and source file/line numbers.

Step 15.1.2 Discard the original call frame section and replace with a newly generated version created by processing the first version, but deleting the DW_CFA_* instructions related to register save/restores which have been removed, and adjusting the offset value provided with DW_CA_* instructions appropriately to denote the lesser adjustment to the processor stack by the reduced/store optimizations in Step 10.

The final automated steps involve generating the executable in the conventional manner, by using the BBs and DATA items rather than the object and library files which were used as input. In Step 12 the symbols were resolved to values and so every BB and DATA item has its address defined.

Step 16 Create an empty ELF Executable file by writing the ELF header to a new file.

Step 17 Iterate across the BBs in order, creating .text section(s) as required and writing the BB contents to each section.

Step 18 Iterate across the DATA items in order, creating .data section(s) as required and writing the DATA contents to each section.

Step 19 Write all other sections (debug information, symbol table etc.) as required.

The performance of the software development tool described herein has been tested and compared against existing software development tools using standard benchmarks.

The benchmark Dhrystone 2.0 is a synthetic benchmark developed by Reinhold P. Weicker designed to mimic statistically the processor usage of some common sets of programs. The Dhrystone benchmark was used on a Freescale Kinetis K64 device (an ARM Cortex M4) using a conventional linker, GNU ld, which is the GNU Project's implementation of the Unix command ln and separately using the software development tool described herein (Re-sequencing Linker) and the results are set out below. For the software development tool described herein the notation BTx is used to identify x byte boundaries with which branch targets are aligned. BTx-back indicates that only branch targets reached by a backwards branch are aligned the majority of which are believed to involve loop iteration as opposed to alternation.

The selected results below in Table 3 are for 1 million iterations of the Dhrystone benchmark for a gcc 4.8.0 at −03 targeting Cortex-M4 and executing at 120 MHz with all caches available. The numbers quoted in the results are in processor cycles (quantised to 5 million boundaries) whereas the percentages are a proportion of the runtime of the result obtained with a plain GNU link

TABLE 3

| Tool | Cycles | Text Size |
|---|---|---|
| GNU ld (plain) | 600M (100%) | 0x757c |
| GNU ld + falign-branches = 16 | 590m (98.3%) | 0x7614 (GCC compiler tries to align the branches) |
| Re-sequencing Linker BT16-back | 580m (96.6%) | 0x77f0 (Re-sequencing Linker aligns the branches) |
| Re-sequencing Linker BT4-back | 585m (97.5%) | 0x75d0 (Re-sequencing Linker aligns the branches) |

The above results illustrate the following:
GNU performs basic branch alignment in the compiler which limits functionality as the compiler does not know the overall memory layout. This compiler branch alignment provides a small improvement but the improvement is not as great as the improvement delivered by the software development tool described herein.
16 byte alignment is probably the performance sweetspot with at best a 3.4% cycle count improvement.
When aligning no branch targets or all branch targets the same performance as the GNU is seen but with a size penalty in the alignment case.
By targeting only backwards branches the software development tool described herein can improve upon the GNU's best result (but with a size penalty).
The software development tool described herein BT-4 is an improvement on all GNU's performance figures whilst keeping code size close to GNU's best value.

The performance of dead code elimination (DCE) in the software development tool described herein (Re-sequencing Linker) was also tested and its performance compared against the performance of a standard (vanilla) GNU. Three different programs were used in the test: 'empty main' (the smallest C/C++ programs), 'full printf' (a simple program which uses the printf( ) function to output complex strings and number values), and Dhrystone 2.0 (as above) and the results of this test are set out below in Table 4.

TABLE 4

|  | text (Kbytes) | data (Kbytes) | total (Kbytes) |
|---|---|---|---|
| *empty main* | | | |
| Standard GNU | 9.9 | 2.3 | 12.3 |
| Re-sequencing Linker | 2.4 | 2.3 | 4.6 |
| codesize savings | −76.18% | −2.34% | −62.09% |
| *full printf* | | | |
| Standard GNU | 24.4 | 2.5 | 26.9 |
| Re-sequencing Linker | 18.2 | 2.3 | 20.6 |
| codesize savings | −25.41% | −5.34% | −23.61% |
| *Dhrystone 2.0* | | | |
| Standard GNU | 29.4 | 12.5 | 41.9 |
| Re-sequencing Linker | 23.0 | 12.3 | 35.3 |
| codesize savings | −21.75% | −1.19% | −15.62% |

As can be seen from the results above, in all cases the software development tool described herein (Re-sequencing Linker) achieved significant codesize savings in comparison to a standard GNU.

The performance of the software development tool described herein was also compared against commercially available compilers from Texas Instruments, Atmel, Infineon and Freescale using the CoreMark™ benchmark developed by the EEMBC (Embedded Microprocessor Benchmark Consortium). The software development tool described herein was found to deliver significant codesize reductions and increases in performance in comparison to the existing commercially available compilers.

Although only a few exemplary embodiments of the present invention have been described in detail above, those skilled in the art will readily appreciate that many modifications are possible in the exemplary embodiments without departing from the novel teachings and advantages of the present invention. Accordingly, all such modifications are intended to be included within the scope of the present invention as defined in the following claims. In particular it is not essential for each and every functional step described above to be performed. Individual steps may be selected and organised in a multiplicity of different combinations whilst still delivering a re-sequencing linker and a software development tool capable of performing improved optimization of software performance.

The invention claimed is:

1. A non-transitory computer-readable tangible medium storing computer-readable instructions for use at the linker stage of a software development tool and adapted to improve the performance of an executable for a specific target computer system comprising at least one processor, a software storage, and read/write memories including caches, buffers, and accelerators, the computer-readable instructions comprising:
   instructions to receive one or more of object files and library files and to analyze instruction sequences and data structures therein used in generation of executables for the specific target computer system;
   instructions to determine interactions of the one or more of the object files and the library files, the at least one processor, and the read/write memories of the specific target computer system with respect to one or more of: relationships between the instruction sequences, relationships between the data structures, and relationships between the instruction sequences and the data structures;
   instructions to re-sequence one or more of:
      (i) at least one of the instruction sequences, and
      (ii) at least one of the data structures
   to generate re-sequenced versions, wherein each generated re-sequenced version has a different set of at least one re-sequenced instruction sequence and/or re-sequenced data structure;
   instructions to determine statically, for each generated re-sequenced version, an Average Case Execution Time (ACET) with respect to one or more processors and one or more read/write memories of the specific target computer system on which the executable is to be executed;
   instructions to select one or more of the generated re-sequenced versions based on each generated re-sequenced version's ACET; and
   instructions to generate the executable using the one or more of the selected re-sequenced versions.

2. The non-transitory computer-readable tangible medium of claim 1, wherein the one or more of the object files and the library files are received from a first compilation and linking operation and the computer-readable instructions further comprise instructions to apply further optimizations following a second compilation and linking operation.

3. The non-transitory computer-readable tangible medium of claim 1, wherein the computer-readable instructions further comprise:
 instructions to determine, for each generated re-sequenced version, a Worse Case Execution Time (WCET) with respect to one or more processors and one or more read/write memories of the specific target computer system on which the executable is to be executed; and
 instructions to select one or more of the generated re-sequenced versions based on a combination of each generated re-sequenced version's ACET and WCET.

4. The non-transitory computer-readable tangible medium of claim 1, wherein:
 the instructions to determine interactions include instructions for identifying to identify object file symbols referenced by the instruction sequences; and
 the instructions to re-sequence include instructions to create one or more basic blocks (BBs) within a plurality of functions (FNs) using the object file symbols.

5. The non-transitory computer-readable tangible medium of claim 1, wherein the instructions to re-sequence include instructions to replace a conditional branch instruction with an IF THEN ELSE instruction by merging at least two basic blocks (BBs) associated with the conditional branch instruction and removing their common EDGE.

6. The non-transitory computer-readable tangible medium of claim 1, wherein the instructions to analyze instruction sequences and data structures include:
 instructions to identify, from the instruction sequences, a plurality of basic blocks (BBs), wherein each basic block (BB) consists of one or more instructions with a single entry point and a single exit point, and a plurality of EDGEs, and wherein each EDGE consists of a source basic block (BB), a destination basic block (BB), and an edgeType; and
 instructions to generate a new plurality of basic blocks (BBs) and a new plurality of EDGEs having, with respect to the entirety of the executable, equivalent semantics to the plurality of basic blocks (BBs) and the plurality of EDGES of the instruction sequences.

7. The non-transitory computer-readable tangible medium of claim 6, wherein the instructions to analyze instruction sequences and data structures further include:
 instructions to determine a function (FN) in a real-time operating system (RTOS) invoked when a system call instruction is executed; and
 instructions to represent EDGEs to system calls as direct branches.

8. The non-transitory computer-readable tangible medium of claim 1, wherein the computer-readable instructions further comprise:
 instructions to identify debugging information entries to selectively disable re-sequencing of basic blocks (BBs) containing volatile memory access instructions.

9. The non-transitory computer-readable tangible medium of claim 1, wherein the computer-readable instructions further comprise:
 instructions to identify DATA items associated only with load operations and to separately identify DATA items associated with both load and store operations; and
 instructions to allocate data memory areas to DATA items associated only with load operations and to separately allocate data memory areas to DATA items associated with both load and store operations so as to reduce D-Miss occurrences.

10. The non-transitory computer-readable tangible medium of claim 1, wherein the computer-readable instructions further comprise:
 instructions to identify one or more unreferenced instruction sequences and to omit the identified one or more unreferenced instruction sequences from the executable.

11. The non-transitory computer-readable tangible medium of claim 1, wherein the non-transitory computer-readable tangible medium is a disk.

12. A computer system for use in improving executable software performance, the computer system comprising at least one processor, a software storage, and read/write memories including caches, buffers, and accelerators, wherein the software storage stores computer-readable instructions for use at the linker stage of a software development tool and adapted to improve the performance of an executable for a specific target computer system, the computer-readable instructions comprising:
 instructions to receive one or more of object files and library files and to analyze instruction sequences and data structures therein used in generation of executables for the specific target computer system;
 instructions to determine interactions of the one or more of the object files and the library files, the at least one processor, and the read/write memories of the specific target computer system with respect to one or more of: relationships between the instruction sequences, relationships between the data structures, and relationships between the instruction sequences and the data structures;
 instructions to re-sequence one or more of:
  (i) at least one of the instruction sequences, and
  (ii) at least one of the data structures
 to generate re-sequenced versions, wherein each generated re-sequenced version has a different set of at least one re-sequenced instruction sequence and/or re-sequenced data structure;
 instructions to determine statically, for each generated re-sequenced version, an Average Case Execution Time (ACET) with respect to one or more processors and one or more read/write memories of the specific target computer system on which the executable is to be executed;
 instructions to select one or more of the generated re-sequenced versions based on each generated re-sequenced version's ACET; and
 instructions to generate the executable using the one or more of the selected re-sequenced versions.

13. The computer system of claim 12, wherein the one or more of the object files and the library files are received from a first compilation and linking operation and the computer-readable instructions further comprise instructions to apply further optimizations following a second compilation and linking operation.

14. The computer system of claim 12, wherein the computer-readable instructions further comprise:
 instructions to determine, for each generated re-sequenced version, a Worse Case Execution Time (WCET) with respect to one or more processors and one or more read/write memories of the specific target computer system on which the executable is to be executed; and instructions to select one or more of the generated re-sequenced versions based on a combination of each generated re-sequenced version's ACET and WCET.

15. The computer system of claim 12, wherein the computer-readable instructions further comprise:

instructions to identify debugging information entries to selectively disable re-sequencing of basic blocks (BBs) containing volatile memory access instructions.

16. The computer system of claim 12, wherein the computer-readable instructions further comprise:

instructions to identify DATA items associated only with load operations and to separately identify DATA items associated with both load and store operations; and instructions to allocate data memory areas to DATA items associated only with load operations and to separately allocate data memory areas to DATA items associated with both load and store operations so as to reduce D-Miss occurrences.

17. A method for improving the performance of an executable for a specific target computer system comprising at least one processor, a software storage, and read/write memories including caches, buffers, and accelerators during generation of the executable for the specific target computer system, the method comprising the following steps:

receiving one or more of object files and library files and analyzing instruction sequences and data structures therein used in generation of executables for the specific target computer system;

determining interactions of the one or more of the object files and the library files, the at least one processor, and the read/write memories of the specific target computer system with respect to one or more of: relationships between the instruction sequences, relationships between the data structures, and relationships between the instruction sequences and the data structures;

re-sequencing one or more of:

(i) at least one of the instruction sequences, and (ii) at least one of the data structures to generate re-sequenced versions, wherein each generated re-sequenced version has a different set of at least one re-sequenced instruction sequence and/or re-sequenced data structure;

determining statically, for each generated re-sequenced version, an Average Case Execution Time (ACET) with respect to one or more processors and one or more read/write memories of the specific target computer system on which the executable is to be executed;

selecting one or more of the generated re-sequenced versions based on each generated re-sequenced version's ACET; and generating the executable using the one or more of the selected re-sequenced versions.

18. The method of claim 17, wherein the one or more of the object files and the library files are received from a first compilation and linking operation and the method further comprises applying further optimizations following a second compilation and linking operation.

19. The method of claim 17, further comprising:

determining, for each generated re-sequenced version, a Worse Case Execution Time (WCET) with respect to one or more processors and one or more read/write memories of the specific target computer system on which the executable is to be executed; and selecting one or more of the generated re-sequenced versions based on a combination of each generated re-sequenced version's ACET and WCET.

20. The method of claim 17, further comprising:

identifying debugging information entries to selectively disable re-sequencing of basic blocks (BBs) containing volatile memory access instructions.

21. The method of claim 17, further comprising:

identifying DATA items associated only with load operations and separately identifying DATA items associated with both load and store operations; and allocating data memory areas to DATA items associated only with load operations and separately allocating data memory areas to DATA items associated with both load and store operations so as to reduce D-Miss occurrences.

* * * * *